US012351779B2

(12) United States Patent
Blattner et al.

(10) Patent No.: US 12,351,779 B2
(45) Date of Patent: Jul. 8, 2025

(54) STABILITY AND VISCOSITY IN HIGH ACTIVE HIGH CAUSTIC LAUNDRY EMULSION WITH LOW HLB SURFACTANT

(71) Applicant: ECOLAB USA INC., Saint Paul, MN (US)

(72) Inventors: Amanda Ruth Blattner, Saint Paul, MN (US); David Dotzauer, Saint Paul, MN (US); Agbeko Yao Sallah, Saint Paul, MN (US); Paige Mary Owens-Polta, Saint Paul, MN (US); Alyssa Ana Hantzsch, Saint Paul, MN (US); Brendon Daniel Disrud, Saint Paul, MN (US); Alissa Rachel Ellingson, Saint Paul, MN (US); Gang Pu, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 685 days.

(21) Appl. No.: 17/457,586

(22) Filed: Dec. 3, 2021

(65) Prior Publication Data

US 2022/0177809 A1 Jun. 9, 2022

Related U.S. Application Data

(60) Provisional application No. 63/199,072, filed on Dec. 4, 2020.

(51) Int. Cl.

| | |
|---|---|
| ***C11D 1/66*** | (2006.01) |
| ***C11D 1/72*** | (2006.01) |
| ***C11D 1/825*** | (2006.01) |
| ***C11D 3/04*** | (2006.01) |
| ***C11D 3/22*** | (2006.01) |
| ***C11D 3/33*** | (2006.01) |
| ***C11D 3/36*** | (2006.01) |
| ***C11D 3/37*** | (2006.01) |
| ***C11D 17/00*** | (2006.01) |
| ***D06L 1/20*** | (2006.01) |

(52) U.S. Cl.

CPC ................ *C11D 3/044* (2013.01); *C11D 1/72* (2013.01); *C11D 1/8255* (2013.01); *C11D 3/222* (2013.01); *C11D 3/3765* (2013.01); *C11D 17/0008* (2013.01); *D06L 1/20* (2013.01); *C11D 2111/12* (2024.01)

(58) Field of Classification Search

None

See application file for complete search history.

(56) References Cited

U.S. PATENT DOCUMENTS

| | | | |
|---|---|---|---|
| 3,929,678 A | 12/1975 | Laughlin et al. | |
| 5,066,710 A | 11/1991 | Simonet et al. | |
| 5,266,690 A | 11/1993 | McCurry, Jr. et al. | |
| 5,294,693 A | 3/1994 | Egraz et al. | |
| 5,362,415 A | 11/1994 | Egraz et al. | |
| 5,639,841 A | 6/1997 | Jenkins | |
| 5,891,972 A | 4/1999 | Egraz et al. | |
| 6,194,371 B1 | 2/2001 | Donovan et al. | |
| 6,537,960 B1 | 3/2003 | Ruhr et al. | |
| 6,767,973 B2 | 7/2004 | Suau et al. | |
| 6,777,003 B1 | 8/2004 | Desai et al. | |
| 7,534,760 B2 | 5/2009 | Johansson et al. | |
| 8,021,650 B2 | 9/2011 | Tamareselvy et al. | |
| 9,062,131 B2 | 6/2015 | Lepilleur et al. | |
| 9,080,135 B2 | 7/2015 | Hough et al. | |
| 9,180,084 B2 | 11/2015 | Lepilleur et al. | |
| 9,724,288 B2 | 8/2017 | Graham et al. | |
| 9,752,109 B2 | 9/2017 | Dürrschmidt et al. | |
| 9,782,609 B2 | 10/2017 | Franzke et al. | |
| 9,931,290 B2 | 4/2018 | Tamareselvy | |
| 2005/0159568 A1 | 7/2005 | Suau et al. | |
| 2008/0274930 A1 * | 11/2008 | Smith ..................... | C23G 1/22 510/221 |
| 2013/0129639 A1 | 5/2013 | Anderson et al. | |
| 2013/0183361 A1 | 7/2013 | Tamareselvy et al. | |
| 2014/0202485 A1 | 7/2014 | Wang et al. | |
| 2020/0231906 A1 | 7/2020 | Bull et al. | |

(Continued)

FOREIGN PATENT DOCUMENTS

| | | | | |
|---|---|---|---|---|
| EP | 1272159 B1 | 1/2003 | | |
| EP | 1348755 B1 | 10/2003 | | |
| EP | 2883573 A1 * | 6/2015 | ............... | A61K 8/00 |

(Continued)

OTHER PUBLICATIONS

United States Patent and Trademark Office in connection with U.S. Appl. No. 11/129,457, "Certificate of Correction", 1 page, dated May 19, 2009.
Acusol™ Rheology Modifiers, "Acusol™ Rheology Modifiers for Home and Fabric Care Products", pp. 1-5, 2020.
Sachin, Talwar, "Hydrophobically Modified Associative Polymers: Solution Rheology and Applications in Electrospinning", Chemical Engineering, pp. 1-237, 2008.
Zahradnik, Von M., "Weißtoner", Nachr. Chem. Tech. Lab. 31, Nr. 7, p. 537, 1983.

*Primary Examiner* — Lorna M Douyon

(74) *Attorney, Agent, or Firm* — McKee, Voorhees & Sease, PLC

(57) ABSTRACT

High active, high caustic liquid laundry detergent compositions which provide excellent stability are disclosed, including methods of making and using the same. The compositions generally comprise a source of alkalinity, a rheology modifier, one or more sequestering agents, one or more low mole ethoxylated nonionic surfactants, and an alkylpolysaccharide surfactant. The liquid detergent emulsions, provided as a concentrate, water-in-oil use solution emulsion, or oil-in-water use solution emulsion beneficially demonstrate improved stability even under high pH and high temperature conditions.

19 Claims, 2 Drawing Sheets

(56) References Cited

U.S. PATENT DOCUMENTS

2020/0277547 A1 * 9/2020 Pautsch .................... C11D 3/42

FOREIGN PATENT DOCUMENTS

| | | | |
|---|---|---|---|
| EP | 2379689 | B1 | 4/2018 |
| WO | 2007101470 | A1 | 9/2007 |
| WO | 2014154244 | A1 | 10/2014 |

* cited by examiner

STABILITY AND VISCOSITY IN HIGH ACTIVE HIGH CAUSTIC LAUNDRY EMULSION WITH LOW HLB SURFACTANT

CROSS REFERENCE TO RELATED APPLICATIONS

This application claims priority under 35 U.S.C. § 119 to provisional application Ser. No. 63/199,072, filed Dec. 4, 2020, herein incorporated by reference in its entirety.

FIELD OF THE TECHNOLOGY

The disclosure relates to liquid detergent compositions, which demonstrate excellent emulsion stability while maintaining an acceptable or ideal viscosity, and to a method for using the compositions, particularly methods for washing textiles. The liquid detergent compositions can be provided as a concentrate or as a use solution. The liquid detergent compositions in the form of the concentrate or the use solution are water-in-oil emulsions or oil-in-water emulsions, depending on the relative amounts of water and oil in the emulsion.

BACKGROUND OF THE TECHNOLOGY

Liquid detergents have many practical applications. Such detergents typically include a source of alkalinity and one or more surfactants along with any number of builders, water-conditioners, dispersants, soil-release polymers, enzymes, bleaching agents, brighteners/whitening agents, dyes, fragrances, and the like. However, developing formulations which provide satisfactory detersive performance and suitable preservation of the article to be cleaned (e.g., for textiles, maintaining soft feel, preventing yellowing/fading, and not damaging the fabric) while maintaining ideal viscosity and a stable emulsion poses a substantial challenge. High levels of an alkalinity source correspond to effective soil removal. However, such levels of caustic can destabilize a liquid formulation, causing phase separation or a collapse of the viscosity. In order for proper functioning and dispensation, the liquid detergent cannot separate and must maintain a desirable viscosity.

Many existing products separate during storage and are not readily redispersed. In some cases, the product viscosity changes and it becomes either too thick to pour or so thin as to appear watery. Some clear products become cloudy and others gel on standing. Other products successfully stabilize high alkaline emulsions and maintain an acceptable viscosity but are not cost-effective or easy to manufacture.

For example, WO 2014/154244 discusses a liquid detergent composition comprising a stable emulsion. WO 2014/154244 utilizes a stabilizing system comprising a blend of several polymers, particularly an acrylic acid crosslinked copolymer (e.g., Carbopol®). However, the preparation and production of such a stabilizing system is not ideal due to the cost of materials and preparation.

WO 2007/101470 pertains to a liquid detergent composition which is storage-stable and provides good washing performance, even on delicate surfaces. However, this disclosure still limits the alkalinity source to relatively small amounts, and the composition requires solubilizers which are able to keep the components in solution and the resulting emulsion stable. The compositions therefore also include cost-ineffective polyacrylic acids or polymethacrylic acids, such as those available under the trade name Carbopol®, for example Carbopol ETD 2691.

These existing compositions are not cost-effective due to the production process required to introduce the polyacrylic acid/polymethacrylic acid thickeners and stabilizers into the emulsion. The production process of the emulsions of the state of art requires the use of a pre-mix to introduce the polymer(s) into the formula. This pre-mix is both expensive and time-consuming due to the nature of the addition, which also involves a milling step. Within the pre-mix, a powder eductor recirculates a liquid surfactant to which the powder polymer is added. This pre-mix is then added to the rest of the emulsion.

U.S. Pat. App. 2020/0277547 utilizes a less expensive acrylic copolymer thickening agent to stabilize a high caustic liquid laundry detergent emulsion. However, the stability of these compositions, while acceptable, could be improved further. Beneficially, the compositions described here utilize an acrylic copolymer in combination with low mole linear alcohol ethoxylates in order to improve stability and maintain viscosity while reducing cost, even compared to existing compositions, such as those of U.S. Pat. App. 2020/0277547.

Accordingly, an object of the disclosure is to provide a liquid detergent composition having improved stability, in particular having an emulsion which is stable for at least a year, and which provides improved or at least substantially similar cleaning performance as other existing liquid detergent compositions.

A further object of the disclosure is to provide a liquid detergent composition which maintains an ideal viscosity and retains emulsion even under high pH conditions.

A further object of the disclosure is to provide a more cost-effective, stable, and viscous liquid detergent composition which may be prepared using a pre-mix or without requiring a pre-mix.

Other objects, advantages and features of the detergent compositions disclosed herein and use thereof will become apparent from the following specification taken in conjunction with the accompanying drawings.

BRIEF SUMMARY OF THE TECHNOLOGY

In an embodiment, the liquid detergent compositions comprise an alkalinity source; a rheology modifier; one or more sequestering agents; one or more nonionic surfactants; and an alkylpolysaccharide. According to an embodiment, the alkalinity source comprises an alkali metal hydroxide, alkali metal carbonate, alkali metal silicate, or a combination thereof. In an embodiment, the nonionic surfactant comprises an alcohol ethoxylate, an alcohol alkoxylate, a propoxylated alcohol, an ethylene oxide adduct of tridecyl alcohol, or a combination thereof. According to a preferred embodiment, the nonionic surfactant comprises a 3 to 9 mole ethoxylate of a $C_{12}$-$C_{14}$ alcohol or a 3 to 9 mole ethylene oxide adduct of tridecyl alcohol, or a combination thereof.

In an embodiment, the alkylpolysaccharide is a compound according to the formula:

$$RO(R^1O)_tZ_x$$

wherein Z is a moiety derived from a reducing saccharide containing from 5 to 6 carbon atoms, R is a hydrophobic $C_8$-$C_{20}$ group, $R^1$ is a $C_2$-$C_4$ group, t is from 0 to about 30, and x is a number from about 0 to about 10.

According to a preferred embodiment, the alkylpolysaccharide is a compound according to the formula:

$$R_1O(R_2O)_b(Z)_a$$

wherein $R_1$ is a monovalent organic radical having from about 6 to about 30 carbon atoms; $R_2$ is a divalent alkylene radical having from 2 to 4 carbon atoms; b is a number from 0 to about 12; a is a number from 1 to about 6, and Z is a saccharide residue having 5 or 6 carbon atoms.

In an embodiment, the sequestering agent comprises an aminocarboxylate, aminophosphonate, phosphonate, polycarboxylate, or a combination thereof. According to a preferred embodiment, the sequestering agent is a polycarboxylate, and wherein the polycarboxylate is an acrylic acid homopolymer, a maleic acid homopolymer, an acrylic acid/maleic acid copolymer, or a combination thereof.

In an embodiment, the rheology modifier is an acrylic copolymer. According to a preferred embodiment, the rheology modifier is an acrylic copolymer according to the formula:

$$A_a\text{-}B_b\text{-}C_c\text{-}D_d$$

wherein A is at least one ethylenically unsaturated monomer having one or more carboxylic acid groups, a is the weight percent of A on the basis of the total weight of the monomer units, B is at least one ethylenically unsaturated monomer not having a carboxylic acid group, b is the weight percent of B on the basis of the total weight of the monomer units, C is at least one oxyalkylated monomer having ethylenic unsaturation and which is terminated by a hydrophobic fatty chain, c is the weight percent of C on the basis of the total weight of the monomer units, D is optional and if present comprises at least one monomer having at least two sites of ethylenic unsaturation, and d is the weight percent of D on the basis of the total weight of the monomer units.

In a preferred embodiment, the composition comprises two sequestering agents and three nonionic surfactants. In some embodiments, the composition is free of Guerbet alcohols or the composition is free of nonionic surfactants having a degree of ethoxylation of greater than 9, or both. According to preferred embodiments, the composition has a viscosity of between about 500 cPs and about 1500 cPs.

In an embodiment, the composition comprises from about 10 wt. % to about 50 wt. % of the alkalinity source, from about 0.1 wt. % to about 5 wt. % of the rheology modifier, from about 0.5 wt. % to about 15 wt. % of the sequestering agent, from about 0.5 wt. % to about 25 wt. % of the surfactant.

Methods of dispensing a liquid detergent are also provided. In an embodiment, the method of dispensing a liquid detergent composition for washing textiles comprises dispensing the liquid detergent composition comprising: an alkalinity source, a rheology modifier, a sequestering agent, and a nonionic surfactant into a washing machine; wherein the composition has a viscosity of less than about 6000 cPs.

According to an embodiment, the method uses a detergent composition as follows. The alkalinity source comprises an alkali metal hydroxide, alkali metal carbonate, alkali metal silicate, or a combination thereof. In an embodiment, the nonionic surfactant comprises an alcohol ethoxylate, an alcohol alkoxylate, a propoxylated alcohol, an ethylene oxide adduct of tridecyl alcohol, or a combination thereof. According to a preferred embodiment, the nonionic surfactant comprises a 3 to 9 mole ethoxylate of a $C_{12}$-$C_{14}$ alcohol or a 3 to 9 mole ethylene oxide adduct of tridecyl alcohol, or a combination thereof.

In an embodiment, the alkylpolysaccharide is a compound according to the formula:

$$RO(R^1O)_tZ_x$$

wherein Z is a moiety derived from a reducing saccharide containing from 5 to 6 carbon atoms, R is a hydrophobic $C_8$-$C_{20}$ group, $R^1$ is a $C_2$-$C_4$ group, t is from 0 to about 30, and x is a number from about 0 to about 10.

According to a preferred embodiment, the alkylpolysaccharide is a compound according to the formula:

$$R_1O(R_2O)_b(Z)_a$$

wherein $R_1$ is a monovalent organic radical having from about 6 to about 30 carbon atoms; $R_2$ is a divalent alkylene radical having from 2 to 4 carbon atoms; b is a number from 0 to about 12; a is a number from 1 to about 6, and Z is a saccharide residue having 5 or 6 carbon atoms.

In an embodiment, the sequestering agent comprises an aminocarboxylate, aminophosphonate, phosphonate, polycarboxylate, or a combination thereof. According to a preferred embodiment, the sequestering agent is a polycarboxylate, and wherein the polycarboxylate is an acrylic acid homopolymer, a maleic acid homopolymer, an acrylic acid/maleic acid copolymer, or a combination thereof.

In an embodiment, the rheology modifier is an acrylic copolymer. According to a preferred embodiment, the rheology modifier is an acrylic copolymer according to the formula:

$$A_a\text{-}B_b\text{-}C_c\text{-}D_d$$

wherein A is at least one ethylenically unsaturated monomer having one or more carboxylic acid groups, a is the weight percent of A on the basis of the total weight of the monomer units, B is at least one ethylenically unsaturated monomer not having a carboxylic acid group, b is the weight percent of B on the basis of the total weight of the monomer units, C is at least one oxyalkylated monomer having ethylenic unsaturation and which is terminated by a hydrophobic fatty chain, c is the weight percent of C on the basis of the total weight of the monomer units, D is optional and if present comprises at least one monomer having at least two sites of ethylenic unsaturation, and d is the weight percent of D on the basis of the total weight of the monomer units.

In a preferred embodiment, the composition comprises two sequestering agents and three nonionic surfactants. In some embodiments, the composition is free of Guerbet alcohols or the composition is free of nonionic surfactants having a degree of ethoxylation of greater than 9, or both. According to preferred embodiments, the composition has a viscosity of between about 500 cPs and about 1500 cPs.

In an embodiment, the composition comprises from about 10 wt. % to about 50 wt. % of the alkalinity source, from about 0.1 wt. % to about 5 wt. % of the rheology modifier, from about 0.5 wt. % to about 15 wt. % of the sequestering agent, from about 0.5 wt. % to about 25 wt. % of the surfactant.

According to an embodiment, the method of dispensing further comprises diluting the liquid detergent composition before the liquid detergent composition is dispensed into the washing machine.

Methods of cleaning a textile are also provided, the method of cleaning a textile comprising diluting a detergent composition comprising an alkalinity source, a rheology modifier, a sequestering agent, and a nonionic surfactant into a washing machine, wherein the composition has a viscosity of less than about 6000 cPs to form a use solution; and contacting a textile with the use solution.

According to an embodiment, the method uses a detergent composition as follows. The alkalinity source comprises an alkali metal hydroxide, alkali metal carbonate, alkali metal silicate, or a combination thereof. In an embodiment, the nonionic surfactant comprises an alcohol ethoxylate, an alcohol alkoxylate, a propoxylated alcohol, an ethylene oxide adduct of tridecyl alcohol, or a combination thereof. According to a preferred embodiment, the nonionic surfactant comprises a 3 to 9 mole ethoxylate of a $C_{12}$-$C_{14}$ alcohol or a 3 to 9 mole ethylene oxide adduct of tridecyl alcohol, or a combination thereof.

In an embodiment, the alkylpolysaccharide is a compound according to the formula:

$$RO(R^1O)_tZ_x$$

wherein Z is a moiety derived from a reducing saccharide containing from 5 to 6 carbon atoms, R is a hydrophobic $C_8$-$C_{20}$ group, IV is a $C_2$-$C_4$ group, t is from 0 to about 30, and x is a number from about 0 to about 10.

According to a preferred embodiment, the alkylpolysaccharide is a compound according to the formula:

$$R_1O(R_2O)_b(Z)_a$$

wherein $R_1$ is a monovalent organic radical having from about 6 to about 30 carbon atoms; $R_2$ is a divalent alkylene radical having from 2 to 4 carbon atoms; b is a number from 0 to about 12; a is a number from 1 to about 6, and Z is a saccharide residue having 5 or 6 carbon atoms.

In an embodiment, the sequestering agent comprises an aminocarboxylate, aminophosphonate, phosphonate, polycarboxylate, or a combination thereof. According to a preferred embodiment, the sequestering agent is a polycarboxylate, and wherein the polycarboxylate is an acrylic acid homopolymer, a maleic acid homopolymer, an acrylic acid/maleic acid copolymer, or a combination thereof.

In an embodiment, the rheology modifier is an acrylic copolymer. According to a preferred embodiment, the rheology modifier is an acrylic copolymer according to the formula:

$$A_a\text{-}B_b\text{-}C_c\text{-}D_d$$

wherein A is at least one ethylenically unsaturated monomer having one or more carboxylic acid groups, a is the weight percent of A on the basis of the total weight of the monomer units, B is at least one ethylenically unsaturated monomer not having a carboxylic acid group, b is the weight percent of B on the basis of the total weight of the monomer units, C is at least one oxyalkylated monomer having ethylenic unsaturation and which is terminated by a hydrophobic fatty chain, c is the weight percent of C on the basis of the total weight of the monomer units, D is optional and if present comprises at least one monomer having at least two sites of ethylenic unsaturation, and d is the weight percent of D on the basis of the total weight of the monomer units.

In a preferred embodiment, the composition comprises two sequestering agents and three nonionic surfactants. In some embodiments, the composition is free of Guerbet alcohols or the composition is free of nonionic surfactants having a degree of ethoxylation of greater than 9, or both. According to preferred embodiments, the composition has a viscosity of between about 500 cPs and about 1500 cPs.

In an embodiment, the composition comprises from about 10 wt. % to about 50 wt. % of the alkalinity source, from about 0.1 wt. % to about 5 wt. % of the rheology modifier, from about 0.5 wt. % to about 15 wt. % of the sequestering agent, from about 0.5 wt. % to about 25 wt. % of the surfactant.

In a preferred embodiment, the composition, including the composition used in any of the methods, has a viscosity of less than 2500 cPs. In a further embodiment, the washing machine used in any of the methods is an institutional washing machine.

While multiple embodiments are disclosed, still other embodiments of the present disclosure will become apparent based on the detailed description, which shows and describes illustrative embodiments of the disclosure. Each feature of the technology described herein may be combined with any one or more other features of the disclosure, e.g., the methods may be used with any composition described herein. Accordingly, the drawings and detailed description are to be regarded as illustrative in nature and not restrictive.

DETAILED DESCRIPTION OF THE TECHNOLOGY

Figure 1:
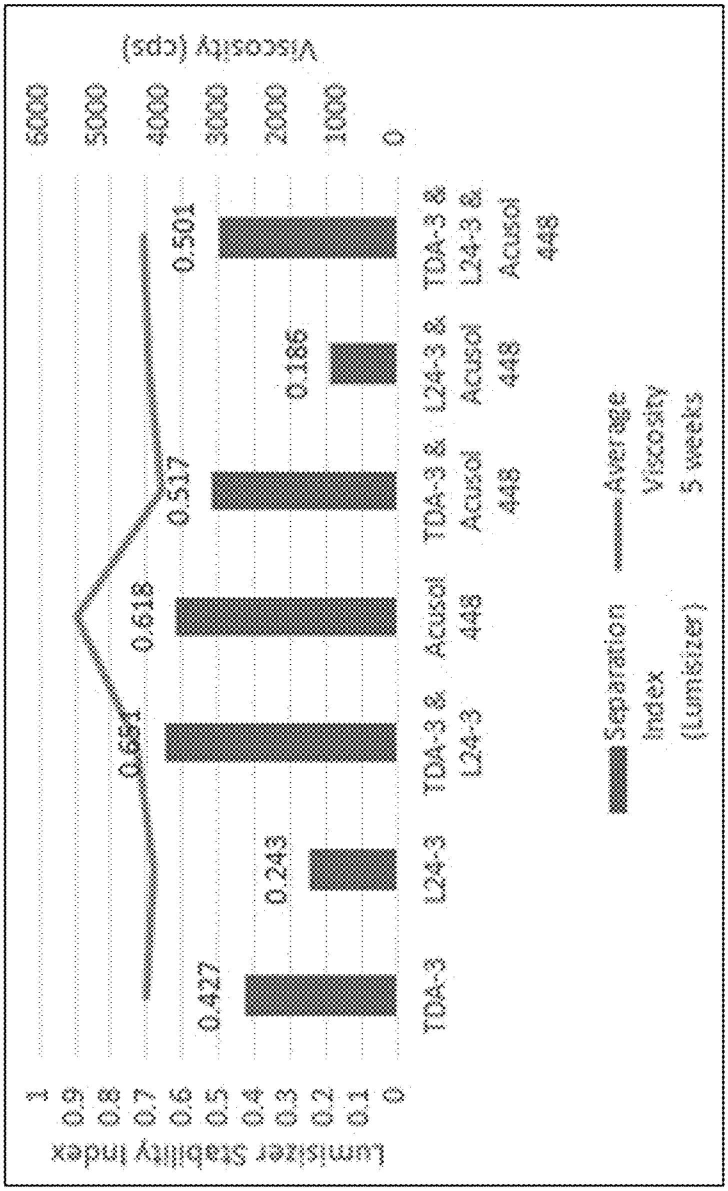
FIG. 1 is a graphical representation showing the average viscosity and LUMisizer stability index for compositions including various combinations of ethoxylated surfactants and polymers.

The embodiments of this disclosure are not limited to a particular method or product, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Unless indicated otherwise, "or" can mean any one alone or any combination thereof, e.g., "A, B, or C" means the same as any of A alone, B alone, C alone, "A and B," "A and C," "B and C" or "A, B, and C." Further, all units, prefixes, and symbols may be denoted in its SI accepted form.

Numeric ranges recited within the specification are inclusive of the numbers defining the range and include each integer within the defined range. Throughout this disclosure, various embodiments of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present application without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

For the purpose of this disclosure, successful microbial reduction is achieved when the microbial populations are reduced by at least about 50%, or by significantly more than is achieved by a wash with water. Larger reductions in microbial population provide greater levels of protection.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Example treated fibers include those treated for flame retardancy. It should be understood that the term "linen" is often used to describe certain types of laundry items including bed sheets, pillowcases, towels, table linen, tablecloth, bar mops and uniforms. The disclosure additionally provides a composition and method for treating non-laundry articles and surfaces including hard surfaces such as dishes, glasses, and other ware.

As used herein, the term "polymer" generally includes, but is not limited to, homopolymers, copolymers, such as for example, block, graft, random and alternating copolymers, terpolymers, and higher "x"mers, further including their derivatives or combinations thereof. Furthermore, unless otherwise specifically limited, the term "polymer" shall include all possible isomeric configurations of the molecule, including, but are not limited to isotactic, syndiotactic, and random symmetries, and combinations thereof. Furthermore, unless otherwise specifically limited, the term "polymer" shall include all possible geometrical configurations of the molecule.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

The term "substantially similar" or a variation thereof refers generally to a substitute ingredient (e.g., liquid acid substituted with solidified acid) to providing generally the same degree (or at least not a significantly lesser degree) of the referenced activity or effect.

The term "surfactant" as used herein is a compound that contains a lipophilic segment and a hydrophilic segment, which when added to water or solvents, reduces the surface tension of the system.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the disclosure include but are not limited to, those that include polycarbonate (PC) polymers, acrilonitrile-butadiene-styrene (ABS) polymers, and polysulfone (PS) polymers. Another example plastic that can be cleaned using the compounds and compositions of the disclosure include polyethylene terephthalate (PET).

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt. %," etc.

The methods and compositions of the present disclosure may comprise, consist essentially of, or consist of the components and ingredients of the present disclosure as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Compositions

According to embodiments, the compositions include an alkalinity source, an acrylic copolymer, one or more polycarboxylates, one or more low mole linear alcohol ethoxylate nonionic surfactants, and an alkylpolyglucoside. The compositions may be provided as a liquid detergent concentrate comprising an emulsion having a water phase and an oil phase. Example detergent compositions are shown in Table 1 in weight percentage of the total composition.

TABLE 1

| Material | First Example Range wt. % | Second Example Range wt. % | Third Example Range wt. % | Fourth Example Range wt. % |
|---|---|---|---|---|
| Alkalinity Source | 20-95 | 40-95 | 40-60 | 10-50 |
| Rheology Modifier | 0.01-15 | 0.1-5 | 1-3 | 1-3 |
| Sequestering Agent(s) | 1-30 | 1-20 | 5-15 | 5-15 |
| Ethoxylated Nonionic Surfactant(s) | 5-35 | 10-40 | 10-30 | 0.5-20 |
| Additional Surfactant(s) | 0.01-50 | 5-50 | 10-45 | 10-40 |
| Additional Functional Ingredients | 0-20 | 0-15 | 0-10 | 0-10 |
| Water | 0-99 | Remainder | Remainder | Remainder |

In an embodiment, the composition includes more than one polycarboxylate and more than one linear alcohol ethoxylate. In a preferred embodiment, the composition includes at least two polycarboxylates. Additionally, in a preferred embodiment, the composition includes at least two linear alcohol ethoxylates. Example detergent compositions are shown in Table 2 in weight percentage of the total composition.

TABLE 2

| Material | First Example Range wt. % | Second Example Range wt. % | Third Example Range wt. % |
|---|---|---|---|
| Alkalinity Source | 20-95 | 40-95 | 40-65 |
| Acrylic Copolymer Rheology Modifier | 0.01-15 | 0.1-5 | 1-3 |
| First Polycarboxylate | 0.1-20 | 0.5-15 | 1-10 |
| Second Polycarboxylate | 0-10 | 0.5-8 | 1-5 |
| First Linear Alcohol Ethoxylate | 0.1-15 | 0.5-10 | 1-9 |
| Second Linear Alcohol Ethoxylate | 1-25 | 2-20 | 5-15 |
| Additional Nonionic Surfactant (e.g., ethoxylated surfactant) | 0-15 | 0-10 | 0-5 |

TABLE 2-continued

| Material | First Example Range wt. % | Second Example Range wt. % | Third Example Range wt. % |
|---|---|---|---|
| Alkylpolyglucoside | 0.01-15 | 0.1-5 | 1-3 |
| Additional Functional Ingredients | 0-20 | 1-15 | 1-10 |
| Water | 0-99 | 5-75 | 10-50 |

Example concentrations are provided for the additional functional ingredients in each of Table 1 and Table 2, however one or more additional functional ingredients or water may comprise the remainder of any of the compositions in Table 1 or Table 2 such that the weight percent totals about 100%. The liquid detergent composition is a stable emulsion which exhibits less than 10% phase separation when being stored. The emulsion is stable at both low and high temperatures. For example, if the emulsion is frozen at temperatures below −10° C. and melted thereafter, the emulsion is formed again without stirring the composition. This is particularly important when the emulsion is stored outside for example in wintertime where outside temperatures are lower than −5° C. Even under these extreme conditions the liquid detergent concentrate composition according to the disclosure is a stable emulsion, does not separate and recovers completely at ambient temperatures.

Usually, the detergent composition is made available as a concentrate and is shipped or stored as a concentrate in order to avoid the expense associated with shipping and storing a composition containing a large amount of water. The concentrate is then normally diluted at the location of use to provide a use solution. Furthermore, it is also possible that the concentrate is first diluted to provide a more dilute concentrate and then a ready-to-use composition is prepared by further diluting the diluted concentrate.

Beneficially, the detergent compositions are stable, flowable emulsions which do not undergo phase separation during storage or when exposed to highly different temperature ranges. In an embodiment, the detergent compositions do not undergo phase separation at room temperature storage for a period of at least 6 months. In an embodiment, the detergent compositions do not undergo phase separation at 40° C.-50° C. or refrigeration between 2° C.-10° C. storage for a period of at least 8 weeks (which is also illustrative of room temperature stability of 6 months). As referred to herein, a lack of phase separation is confirmed by less than 10%, preferably less than 5% separation of the detergent composition over the period of time and under defined temperature conditions.

Viscosity

In a preferred embodiment, the liquid detergent concentrate compositions have a viscosity range of from about 3000 cps to about 6000 cps, more preferably between about 500 cps and about 2000 cps. The liquid detergent concentrate compositions according to the disclosure preferably has a viscosity in the range of from about 500 cps to about 2000 cps/cPs. With this viscosity, the detergent compositions may be dispensed using a dispenser having, for example, a peristaltic pump or a diaphragm pump.

Source of Alkalinity

The liquid detergent composition comprises one or more alkalinity sources in an amount of about 20 wt. % to about 95 wt. %, preferably from about 40 to about 60 wt. %. The source of alkalinity can be any suitable source of alkalinity. Examples of suitable sources of alkalinity include, but are not limited alkali metal hydroxides, alkali metal carbonates, alkali metal silicates, alkali metal salts, phosphates, amines, or a combination thereof. In a preferred embodiment the alkalinity source includes alkali metal hydroxides such as sodium hydroxide, potassium hydroxide, and lithium hydroxide or a combination thereof, and most preferred is sodium hydroxide, potassium hydroxide, or a combination thereof.

The liquid detergent concentrate compositions described herein may be provided as a highly alkaline concentrate or as a use solution based on the quantity of the alkalinity source. The alkalinity source controls the pH of the resulting solution when water is added to the detergent composition to form a use solution. The pH of the use solution must be maintained in the alkaline range in order to provide sufficient detergency properties. In a preferred embodiment, the pH of the use solution is at least 8, and is between about 8 and about 14, inclusive of all integers within this range. Particularly, the pH of the use solution is between about 10 and about 14. More particularly, the pH of the use solution is between about 11 and about 14. In a particularly preferred embodiment, the pH of the use solution is from about 10 to about 12.

Example alkali metal hydroxides include sodium hydroxide, potassium hydroxide, and lithium hydroxide. However, most preferred is sodium hydroxide. The source of alkalinity, preferably an alkali metal hydroxide, can be included in a variety of forms, including for example in the form of solid beads, dissolved in an aqueous solution or a combination thereof. Alkali metal hydroxides are commercially available as pellets or beads having a mix of particle sizes, or as an aqueous solution having an active concentration between about 20% and about 90% in the solution. Preferred active concentrations in a solution, include, but are not limited to, about 45%, about 50%, and about 73% alkalinity in the alkaline solution.

Example alkali metal salts include without limitation sodium carbonate, trisodium phosphate, potassium carbonate, and a combination thereof. Example phosphates include without limitation sodium pyrophosphate, potassium pyrophosphate, and a combination thereof. Example amines include without limitation alkanolamine selected from the group comprising triethanolamine, monoethanolamine, diethanolamine, and a combination thereof.

In some embodiments, the alkalinity source is included in the detergent composition at an amount of at least about 20 wt. % to about 95 wt. %, inclusive of all integers within this range. For example, the alkalinity source may be present in an amount of about 40 wt. % to about 95 wt. %, and from about 40 wt. % to about 60 wt. %. Even where, in certain contexts, it is preferable to reduce the quantity of the alkalinity source in a detergent composition, the pH of the composition should still be kept high to provide the desired detergency and cleaning.

Nonionic Surfactants

The compositions include one or more nonionic surfactants. Nonionic surfactants generally improve wettability and contribute to solubilization of components in the detergent composition. In an embodiment, the one or more nonionic surfactants used in the present disclosure beneficially additionally function as one or more of a stabilizer, dispersant, and emulsifier.

The one or more nonionic surfactants are preferably present in an amount of from about 0.01 wt. % to about 50 wt. % of the total composition. In preferred embodiments the compositions include at least two classes of surfactants. In an embodiment, a first class of nonionic surfactant is one or more ethoxylated nonionic surfactants and a second class is one or more alkylpolyglucoside nonionic surfactants, wherein the ethoxylated nonionic surfactant(s) comprise between about 5 wt. % to about 35 wt. %, and the alkylpolyglucoside nonionic surfactants comprise between about 0.01 wt. % to about 15 wt. %, inclusive of all integers within these ranges. In a still further embodiment, the compositions include at least two ethoxylated surfactants, more preferably at least three ethoxylated surfactants.

In an embodiment, the one or more nonionic surfactants include surfactants with a hydrophile-lipophile balance (HLB) of between about 1 to about 15, preferably between about 7 to about 9. The HLB number is used as a measure of the ratio of hydrophilic and lipophilic grounds in a given surfactant or surfactant blend. It is a value between 0 and 60 which functionally defines the affinity of a surfactant for water or oil. Nonionic surfactants in particular typically have an HLB of between 0 and 20. Surfactants having an HLB of >10 have an affinity for water, and surfactants with an HLB of <10 have an affinity for oil.

Nonionic surfactants suitable for use with the compositions of the present disclosure include synthetic or natural alcohols that are alkoxylated with ethylene oxide, propylene oxide, butylene oxide, or a combination thereof, to yield a variety of $C_6$-$C_{24}$ alcohol ethoxylates, propoxylates, butoxylates, or a combination thereof. In a preferred embodiment, the ethoxylates include $C_5$-$C_{24}$ alcohol ethoxylates having 1 to 100 ethylene oxide groups, more $C_{10}$-$C_{16}$ alcohol ethoxylates having about 3 to about 9 moles ethoxylate.

Suitable alkoxylated surfactants for use as surfactants include EO/PO block copolymers, such as the Pluronic® and reverse Pluronic® surfactants, alcohol alkoxylates, such as Dehypon® LS-54 (R-$(EO)_5(PO)_4$); wherein R represents a linear or branched fatty alcohol residue) and Dehypon® LS-36 (R-$(EO)_3(PO)_6$; wherein R represents a linear or branched fatty alcohol residue); and capped alcohol alkoxylates, such as Plurafac® LF221 and Tegoten® EC11; a combination thereof, or the like. More specifically the composition of the present disclosure can include alkoxylated primary or secondary alcohol having from 6 to 24, preferably 6 to 22, more preferred 8 to 18 carbon atoms reacted with from 2 to 18 moles of ethylene, propylene, butylene oxide, or a combination thereof. The following materials are useful: lauryl alcohol ethoxylated with 3 moles of ethylene oxide (EO), coco alcohol ethoxylated with 3 moles EO, stearyl alcohol ethoxylated with 5 moles EO, mixed $C_{12}$-$C_{15}$ alcohol ethoxylated with 7 moles EO, mixed secondary $C_{11}$-$C_{15}$ alcohol ethoxylated with 7 moles EO, mixed $C_9$-$C_{11}$ linear alcohol ethoxylated with 6 moles EO, or a combination thereof.

In a preferred embodiment the one or more nonionic surfactants have from 6 to 24 carbon atoms in the alkyl group, with between 1 to 100 ethylene oxide groups/3 to 9 moles ethylene oxide. In a further embodiment the one or more nonionic surfactants comprise alcohol alkoxylates, particularly the alcohol ethoxylates and propoxylates, especially the mixed ethoxylates and propoxylates, particularly with 3-7 oxyethylene (EO) units and 3-7 oxypropylene (PO) units such as the alcohol Dehypon® available from BASF Corporation, having 5 EO units and 4 PO units. In another embodiment the one or more surfactants comprise alcohol alkoxylates, particularly $C_{12}$-$C_{15}$ alcohol (e.g., mixed CD/Cis alcohol, iso-tridecanol), particularly with 2-20 oxyethylene (EO) units, preferably with 5-12 oxyethylene (EO) units, further preferred with 5-10 oxyethylene (EO) units, in particular with 7 or 8 oxyethylene (EO) units, such as the Lutensol® TO, particularly TO 8, available from BASF and Lutensol® AO, such as AO7 and AO3, available from BASF.

In a preferred embodiment the compositions of the disclosure include one or more linear alcohol ethoxylates, particularly low mole linear alcohol ethoxylates such as 3 to 9 mole ethoxylates of a linear, primary $C_{12}$-$C_{14}$ alcohol. Such alcohol ethoxylates are available commercially as Surfonic® L24-3, Surfonic® L24-5, Surfonic® L24-9, and Novel® surfactants, particularly Novel® TDA-3 and Novel® TDA-9. Novel TDA-3 is a 3 mole ethylene oxide adduct of tridecyl alcohol, while Novel TDA-9 is a 9 mole ethylene oxide adduct of tridecyl alcohol. Surfonic L24-7 is a 7 mole ethoxylate of a linear, primary $C_{12}$-$C_{14}$ alcohol. Surfonic L24-3 is a 3 mole ethoxylate of a linear, primary $C_{12}$-$C_{14}$ alcohol. Surfonic L24-5 is a 5 mole ethoxylate of a linear, primary $C_{12}$-$C_{14}$ alcohol. TDA-9 is a 9-EO alcohol ethoxylate, adduct of tridecyl alcohol.

Suitable alkoxylated surfactants for use as surfactants further include Guerbet alcohol ethoxylates according to the formula $R^6$—$(OC_2H_4)_m$—OH, wherein $R^6$ is a branched $C_9$ to $C_{20}$ alkyl group, preferably a branched $C_9$ to $C_{18}$ alkyl group, further preferred a branched $C_9$-$C_{15}$ alkyl group, more preferred a branched $C_9$-$C_{11}$ alkyl group, most preferred a branched $C_{10}$ alkyl group and m is from 2 to 10, preferably 2 to 6. Such Guerbet alcohols are available, for example, under the trade name Lutensol® XP or M from BASF or Eutanol® G from BASF.

Guerbet alcohols generally have a lower solubility in water compared to linear ethoxylated alcohols with the same number of carbon atoms. Therefore, it can be a challenge to keep Guerbet alcohols in solution, meaning it can be difficult to provide extended storage stability of liquid detergent compositions comprising Guerbet alcohols. In a preferred embodiment, the compositions are free, or substantially free, of Guerbet alcohols.

Additional Surfactants

According to some embodiments, the composition may further comprise additional surfactants, including without limitation one or more anionic, zwitterionic, cationic, or amphoteric surfactants. Where utilized, the one or more additional surfactants may be present in the composition from about 0 wt. % to about 90 wt. %, inclusive of all integers within this range.

Anionic surface-active substances which are categorized as such because the charge on the hydrophobe is negative or surfactants in which the hydrophobic section of the molecule carries no charge unless the pH is elevated to neutrality or above (e.g., carboxylic acids) can also be employed in certain embodiments. Carboxylate, sulfonate, sulfate, and phosphate are the polar (hydrophilic) solubilizing groups found in anionic surfactants. Of the cations (counter ions) associated with these polar groups, sodium, lithium, and potassium impart water solubility; ammonium and substituted ammonium ions provide both water and oil solubility; and calcium, barium, and magnesium promote oil solubility.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g., alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g., alkyl carboxyls). Secondary carboxylates useful in the present compositions include those which contain a carboxyl unit connected to a secondary carbon. The secondary carbon can be in a ring structure, e.g., as in p-octyl benzoic acid, or as in alkyl-substituted cyclohexyl carboxylates. The secondary carboxylate surfactants typically contain no ether linkages, no ester linkages, and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g., N-acyl sarcosinates), taurates (e.g., N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

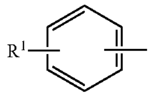

, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_5$-$C_{16}$ alkyl group. In some embodiments, R is a $C_{12}$-$C_{14}$ alkyl group, n is 4, and m is 1.

In other embodiments, R is

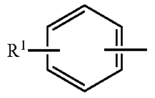

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g., the product Sandopan® DTC, a $C_{13}$ alkyl polyethoxy (7) carboxylic acid.

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate, or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g., 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present disclosure generally have the general formula:

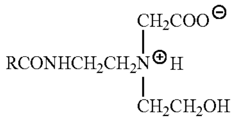

(MONO)ACETATE

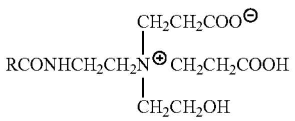

(DI)PROPIONATE
Neutral pH - Zwitterion

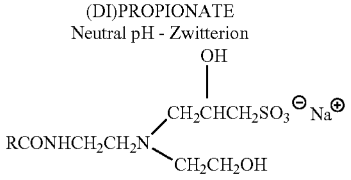

AMPHOTERIC
SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R=$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this disclosure include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+(CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are example zwitterionic surfactants for use herein. A general formula for these compounds is:

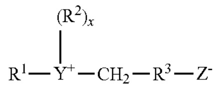

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

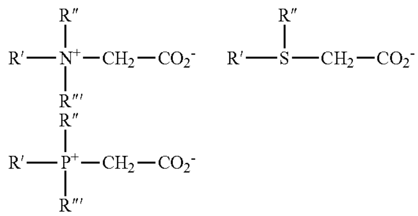

These surfactant betaines typically do not exhibit strong cationic or anionic characters at pH extremes, nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present disclosure include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g., methyl, and $R^2$ is a $C_1$-$C_6$ hydrocarbyl group, e.g., a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic or more water dispersible, more easily water solubilized by co-surfactant mixtures, or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

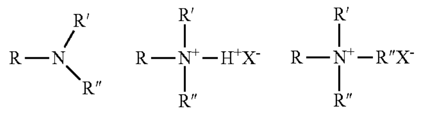

in which, R represents a long alkyl chain, R', R", and R'" may be either long alkyl chains or smaller alkyl or aryl groups or hydrogen and X represents an anion. The amine salts and quaternary ammonium compounds are preferred for practical use in this disclosure due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkyl benzyl dimethyl ammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present disclosure include those having the formula $R^1{}_mR^2{}_xY_LZ$ wherein each $R^1$ is an organic group containing a straight or branched alkyl or alkenyl group optionally substituted with up to three phenyl or hydroxy groups and optionally interrupted by up to four of the following structures:

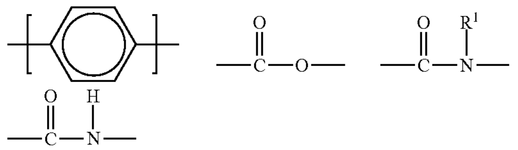

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. In an embodiment, Y is a group including, but not limited to:

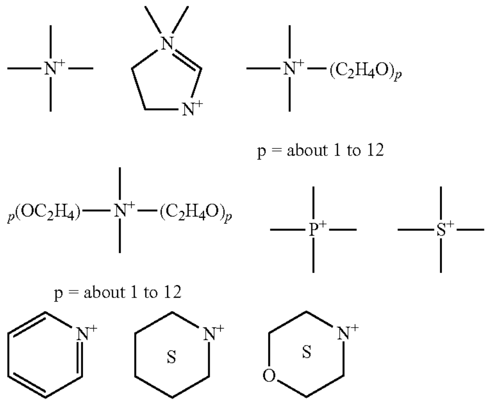

or a combination thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water-soluble anion, such as a halide, sulfate, methylsulfate, hydroxide, or nitrate anion, particularly preferred being chloride, bromide, iodide, sulfate, or methyl sulfate anions, in a number to give electrical neutrality of the cationic component.

Alkyl Polysaccharides

The compositions comprise one or more alkyl polysaccharides, particularly alkyl polyglycosides. Alkyl polysaccharides which are surfactants general include hydrophilic and hydrophobic moieties, giving them solubilizing properties, particularly for hydrophobic substances. The compositions include one or more alkyl polysaccharides in an amount of between about 0.01 wt. % to about 15 wt. %, preferably between about 0.1 wt. % to about 5 wt. %, and more preferably between about 1 wt. % to about 3 wt. %, inclusive of all integers in these ranges. In an embodiment, the alkyl polysaccharides may be commercially available as an aqueous solution having an active concentration between about 20% and about 90% in the solution. Preferred active concentrations in a solution, include, but are not limited to, about 30%, about 50%, and about 75% actives.

Suitable alkylpolysaccharide surfactants include those according to the formula:

$$RO(R^1O)_tZ_x \qquad \text{Formula (I)}$$

wherein Z is a moiety derived from a reducing saccharide containing from 5 to 6 carbon atoms, preferably a glucose, galactose, glucosyl, or galactosyl residue or a combination thereof; R is a hydrophobic group selected from the group consisting of alkyl, alkyl phenyl, hydroxyalkyl phenyl or hydroxyalkyl groups or a combination thereof in which said alkyl groups contain from about 8 to about 20 carbon atoms preferably from about 10 to about 16 carbon atoms, most preferably from about 12 to about 16 carbon atoms; $R^1$ contains from 2 to 4 carbon atoms, preferably ethylene, propylene or glyceryl, t is from 0 to about 30, preferably 0 to about 10, most preferably 0; and wherein x is a number from about 0 to about 10, preferably 1 to 3, most preferably 1.6

More particularly, suitable alkyl polysaccharides include, but are not limited to, those having a hydrophobic group containing from about 8 to about 20 carbon atoms, preferably from about 10 to about 16 carbon atoms, most preferably from 12 to 16 carbon atoms, and a polysaccharide hydrophilic group containing from about Oto about 10, preferably from 1 to 3, most preferably about 1.6 saccharide units (e.g., galacto side, glucoside, fructoside, glucosyl, fructosyl or galactosyl units). Mixtures of saccharide moieties may be used in the alkyl polysaccharide surfactants. The number x indicates the number of saccharide units in a particular alkylpolysaccharide surfactant. For a particular alkylpolysaccharide molecule x can only assume integral values. In any physical sample of alkyl polysaccharide surfactants there will in general be molecules having different x values. The physical sample can be characterized by the average value of x and this average value can assume non-integral values. The values of x are therefore to be understood to be average values. The hydrophobic group (R) can be attached at the 2-, 3-, or 4-positions rather than at the 1-position, (thus giving, for example, a glucosyl or galactosyl as opposed to a glucoside or galactoside). Optionally there can be a polyalkoxide chain joining the hydrophobic moiety (R) and the polysaccharide-chain. Typical hydrophobic groups include alkyl groups, either saturated or unsaturated, branched, or unbranched containing from about 8 to about 20, preferably from about 10 to about 16 carbon atoms. In an embodiment, the alkyl group is a straight chain saturated alkyl group. The alkyl group can contain up to 3 hydroxy groups or the polyalkoxide chain can contain up to about 30, inclusive of all integers between 0 and 30, such as less than 10, or 0, alkoxide moieties.

Suitable alkyl polysaccharides include, but are not limited to, decyl, dodecyl, tetradecyl, hexadecyl, and octadecyl, di-, tri-, tetra-, penta-, and hexaglucosides, galactosides, lactosides, fructosides, fructosyls, lactosyls, glucosyls or galactosyls and a combination thereof. The alkyl monosaccharides are relatively less soluble in water than the higher alkyl polysaccharides. When used in admixture with alkyl polysaccharides, the alkyl monosaccharides are solubilized to some extent. Suitable mixtures include coconut alkyl, di-, tri-, tetra-, and pentaglucosides and tallow alkyl tetra-, penta-, and hexaglucosides.

Especially suitable alkyl polysaccharides are alkyl polyglucosides having the formula:

$R^2O(C_nH_{2n}O)_t(Z)_x$ Formula (II)

wherein Z is derived from glucose, $R^2$ is a hydrophobic group such as an alkyl, alkyl phenyl, hydroxyalkyl, hydroxyalkylphenyl group, or a combination thereof, in which said alkyl groups contain from about 10 to about 18, preferably from 12 to 16 carbon atoms; n is 2-6, t is from 0 to about 10; and x is from 0 to about 10, preferably from 1 to 4, most preferably from 1.6

Preferred alkyl polyglycosides are alkyl polyglycosides having the formula:

$R_1O(R_2O)_b(Z)_a$ Formula (III)

wherein $R_1$ is a monovalent organic radical having from about 6 to about 30 carbon atoms; $R_2$ is a divalent alkylene radical having from 2 to 4 carbon atoms; b is a number from 0 to about 12; a is a number from 1 to about 6, and Z is a saccharide residue having 5 or 6 carbon atoms.

Such alkyl polyglycosides are commercially available, for example, as Glucopon® or Plantaren® surfactants from Henkel Corporation. Examples of such surfactants include but are not limited to Glucopon® 225, an alkyl polyglycoside in which the alkyl group contains 8 to 10 carbon atoms and has an average degree of polymerization of 1.7; Glucopon® 425, an alkyl polyglycoside in which the alkyl group contains 8 to 16 carbon atoms and has an average degree of polymerization of 1.6; Glucopon® 625, an alkyl polyglycoside in which the alkyl group contains 12 to 16 carbon atoms and has an average degree of polymerization of 1.6; APG® 325, an alkyl polyglycoside in which the alkyl group contains 9 to 11 carbon atoms and has an average degree of polymerization of 1.6; Glucopon® 600, an alkyl polyglycoside in which the alkyl group contains 12 to 16 carbon atoms and has an average degree of polymerization of 1.4; Plantaren® 2000, a $C_8$-$C_{18}$ alkyl polyglycoside in which the alkyl group contains 8 to 16 carbon atoms and has an average degree of polymerization of 1.4; Plantaren® 1300, a $C_{12}$-$C_{16}$ alkyl polyglycoside in which the alkyl group contains 12 to 16 carbon atoms and has an average degree of polymerization of 1.6; or a combination thereof.

Other examples include alkyl polyglycosides which are comprised of mixtures of compounds of Formula (III) wherein Z represents a moiety derived from a reducing saccharide containing 5 or 6 carbon atoms, a is a number having a value from 1 to about 6, b is 0; and R is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or a combination thereof with the polyglycoside having a degree of polymerization of 3, predominate in relation to the amount of monoglycoside, such composition having an average degree of polymerization of about 1.8 to about 3. Further discussion of suitable alkyl polyglycosides are discussed in U.S. Pat. Nos. 5,266,690 and 6,777,003, both of which are herein incorporated by reference in their entirety.

Chelants, Sequestrants, Builders, Water Conditioning Polymers

The compositions may also include one or more chelating agents, sequestrants, builders, and water conditioning polymers, herein referred to generally as "chelating agents." In general, a chelating agent is a molecule capable of coordinating (i.e., binding) the metal ions commonly found in natural water to prevent the metal ions from interfering with the action of the other detersive ingredients of a detergent composition. For a further discussion of chelating agents, see Kirk Othmer, Encyclopedia of Chemical Technology, Third Edition, volume 5, pages 339-366 and volume 23, pages 319-320. In preferred embodiments, the total amount of chelating agent(s) present in the compositions is from about 1 wt. % to about 30 wt. %, between about 1 wt. % to about 20 wt. %, or from about 3 wt. % to about 15 wt. %, inclusive of all integers within these ranges.

In a further embodiment, the compositions include at least two chelating agents. When two chelating agents are present, the compositions include a first chelating agent in an amount of between about 0.1 wt. % to about 20 wt. %, between about 0.5 wt. % to about 15 wt. %, or between about 1 wt. % to about 10 wt. % of the total composition, and a second chelating agent in an amount of between about 0 wt. % to about 10 wt. %, between about 0 wt. % to about 8 wt. %, or in an amount of up to about 5 wt. %, inclusive of all integers within these ranges.

In some embodiments, a phosphonate can be included. However, in other embodiments, it is preferred that the compositions are free or substantially free of phosphonates, and other phosphorus containing compounds.

In preferred embodiments of the compositions organic chelating agents may be used. Organic chelating agents include both polymeric and small molecule chelating agents. Organic small molecule chelants are typically organocarboxylate compounds or organophosphate compounds. Polymeric chelants commonly include polyanionic compositions such as polyacrylic acid compounds, carboxy-methylated polyethyleneimine compounds, and a combination thereof. Other suitable chelating agents include organic amino- or hydroxy-polyphosphonic acid complexing agents (either in acid or soluble salt forms), carboxylic acids (e.g., polymeric polycarboxylate), hydroxycarboxylic acids, aminocarboxylic acids, or heterocyclic carboxylic acids.

Example commercially available chelating agents include, but are not limited to gluconic acid salts and sodium tripolyphosphate (STPP), available from Innophos; the aminocarboxylate Trilon® M available from BASF; Versene® 100, Low NTA Versene®, Versene® Powder, and Versenol® 120 all available from Dow; Dissolvine® D-40 and GL-38 available from Akzo; and sodium citrate.

Small molecule organic chelating agents include, for example, aminocarboxylic acids, including salts and derivatives thereof, such as alkali metal salts, amino acetates, and the like. Examples of suitable aminocarboxylates include, without limitation, N-hydroxyethyl amino diacetic acid, also referred to as hydroxyethyliminodiacetic acid (HIDA); nitrilotriacetic acid (NTA); ethylenediaminetetraacetic acid (EDTA); N-(2-hydroxyethyl)ethylenediaminetriacetic acid (HEDTA); diethylenetriaminepentaacetic acid (DTPA); ethylenediaminetetrapropionic (EDTP) acid, triethylenetetraaminehexaacetic acid (TTHA), and alanine-N,N-diacetic acid; N,N-dicarboxymethyl glutamic acid tetrasodium salt (GLDA), methylglycinediacetic acid (MGDA), iminodisuccinate (IDS) and the like, and the respective alkali metal, ammonium and substituted ammonium salts thereof, and a combination thereof. In a preferred embodiment, the compositions comprise (MGDA). Suitable aminocarboxylic acid type chelating agents are commercially available as Trilon® M available from BASF; Versene® 100, Low NTA Versene®, Versene® Powder, and Versenol® 120 all available from Dow; and Dissolvine® D-40 and GL-38 available from Akzo.

Aminophosphonates are also suitable for use as chelating agents) and include ethylenediaminetetramethylene phosphonates, nitrilotris methylene phosphonates, and diethylenetriamine pentamethylene phosphonates, for example. These aminophosphonates commonly contain alkyl or alkenyl groups with 8 or fewer carbon atoms. Preferably, the sequestrant includes phosphonic acid or a phosphonate salt. Suitable phosphonic acids and phosphonate salts include, without limitation, 1-hydroxy ethylidene-1,1-diphosphonic acid (HEDP); ethylenediamine tetra(methylene phosphonic acid) (EDTMP); diethylenetriamine penta(methylene phosphonic acid) (DETPMP); cyclohexane-1,2-tetramethylene phosphonic acid; aminotris(methylene phosphonic acid) (ATMP); 2-phosphonobutane-1,2,4-tricarboxylic acid (PBTC); or salts thereof, such as the alkali metal salts, ammonium salts, or alkyl amine salts, such as mono, di, tri-, or tetra-ethanolamine salts; picolinic, dipicolinic acid or a combination thereof.

Commercially available phosphonate chelating agents include, without limitation, those sold under the trade name DEQUEST® from Italmatch or Cublen® from Zschimmer & Schwarz or Briquest® from Solvay including, for example, HEDP, as DEQUEST® 2010; ATMP, available from Italmatch as DEQUEST® 2000 or from Zschimmer & Schwarz as Cublen® AP5 or from Solvay as Briquest® 301-50A; EDTMP available from Italmatch as DEQUEST® 2041; DTPMP available as DEQUEST® 2066 from Italmatch or as Cublen® D from Zschimmer & Schwarz, and PBTC available from Lanxess as Bayhibit® AM.

Suitable polycarboxylate chelating agents include acrylic acid homopolymers and acrylic acid/maleic acid copolymers. In an embodiment, the one or more polycarboxylate sequestrants may be partially neutralized. In a further embodiment, the one or more polycarboxylate sequestrants may have a molecular weight of between about 1,000 g/mol to about 90,000 g/mol, more preferably between about 3,000 g/mol to about 50,000 g/mol, inclusive of all integers within these ranges. According to an embodiment, the compositions include a low molecular weight polycarboxylate having a molecular weight of between about 2,000 g/mol to 6,000 g/mol, a medium molecular weight polycarboxylate having a molecular weight of between about 30,000 g/mol to about 50,000 g/mol, a partially neutralized polyacrylic acid polycarboxylate, or a combination thereof.

Suitable homopolymeric and copolymeric chelating/sequestering agent(s) include polymeric compositions with pendant (—CO2H) carboxylic acid groups and include polyacrylic acid, polymethacrylic acid, polymaleic acid, acrylic acid-methacrylic acid copolymers, acrylic-maleic copolymers, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, polymaleic acid, polyfumaric acid, copolymers of acrylic and itaconic acid, phosphine polycarboxylate, acid or salt forms thereof, or a combination thereof. Water soluble salts or partial salts of these polymers or copolymers such as their respective alkali metal (for example, sodium or potassium) or ammonium salts can also be used. The weight average molecular weight of the polymers is from about 4,000 to about 90,000.

Examples of suitable commercially available acrylic-maleic acid copolymers include, but are not limited to, Acusol® 505N and Acusol® 448 available from Dow Chemical Company, and Sokalan® CP5, available from BASF Corporation. Acusol® 505N has a molecular weight of about 40,000 g/mol, Acusol® 448 has a molecular weight of between about 3,000 to about 3,500 g/mol and Sokalan® CP5 has a molecular weight of about 70,000 g/mol. Examples of suitable partially neutralized polyacrylic acid (acrylic acid homopolymer) includes Acusol® 944, available from Dow Chemical Company and Acusol® 445, available from Dow Chemical Company. Acusol® 445 is a homopolymer of acrylic acid with an average molecular weight of 4,500 g/mol. Both Acusol® 944 and Acusol® 445 are available as partially neutralized, liquid detergent polymers.

Defoamer

The compositions may further include one or more defoamers or antifoamers. The terms "defoamer" and "antifoamer" are used interchangeably herein to refer to a compound which eliminates or reduces existing foam or prevents the formation of further foam. The one or more defoamers are present in an amount of between about 0 wt. % to about 10 wt. %, from about 0.01 wt. % to about 20 wt. %, from about 0.01 wt. % to about 5 wt. %, from about 0.01 wt. % to about 4 wt. %, from about 0.01 wt. % to about 3 wt. %, from about 0.01 wt. % to about 2 wt. %, from about 0.01 wt. % to about 1.5 wt. %, or from about 0.01 wt. % to about 1 wt. %, inclusive of all integers within these ranges.

Examples of suitable defoamers include, without limitation, silica and silicones; aliphatic acids or esters; alcohols; sulfates or sultanates; amines or amides; halogenated compounds such as fluorochlorohydrocarbons; vegetable oils, waxes, mineral oils as well as their sulfonated or sulfated derivatives; fatty acids or their soaps such as alkali, alkaline earth metal soaps; and phosphates and phosphate esters such as alkyl and alkaline diphosphates, and tributyl phosphates among others; and a combination thereof.

One of the more effective antifoaming agents includes silicones. Silicones such as dimethyl silicone, glycol polysiloxane, methylphenol polysiloxane, trialkyl or tetraalkyl silanes, trialkyl silanes, hydrophobic silica defoamers, or a combination thereof can all be used as defoamers. Commercial defoamers commonly available include silicones such as Ardefoam® from Armour Industrial Chemical Company which is a silicone bound in an organic emulsion; Foam Kill® or Kresseo® available from Krusable Chemical Company which are silicone and non-silicone type defoamers as well as silicone esters; and Anti-Foam A® and DC-200 from Dow Corning Corporation. Other defoamers that can be used include organic amides such as Antimussol® from Clariant or oil or polyalkylene based compounds such as Agitan® from Munzing or branched fatty alcohols such as Isofol® from Sasol.

The compositions of the present disclosure may further include antifoaming agents or defoaming agents which are based on alcohol alkoxylates that are stable in alkaline environments and are oxidatively stable. To this end one of the more effective antifoaming agents are the alcohol alkoxylates having an alcohol chain length of about $C_8$-$C_{12}$, and more specifically $C_9$-$C_{11}$, and having poly-propylene oxide alkoxylate in whole or part of the alkylene oxide portion. Commercial defoamers commonly available of this type include alkoxylates such as the BASF Degressal products, especially Degressal SD20. Furthermore, cloud point defoamers, which are typically nonionic surfactants consisting of ethoxylated/propoxylated alcohols, may also be used in the compositions. Examples of such defoamers include, without limitation, the Plurafac® and Dehypon® surfactant lines from BASF.

Rheology Modifier

The compositions include a rheology modifier, sometimes referred to as a thickener or a viscosity modifier, present in an amount of from about 0.001 wt. % to about 10 wt. %, from about 0.01 wt. % to about 15 wt. %, inclusive of all integers within this range, for example from about 0.1 wt. % to about 5 wt. %, or from about 1 wt. % to about 3 wt. %. In an embodiment, the rheology modifier may be commercially available as an aqueous solution having an active concentration of between about 20% and about 90% in the solution. Preferred active concentrations in a solution include but are not limited to about 30% actives and about 50% actives.

In an embodiment, the compositions include one or more alkali-swellable polymers (ASE) and hydrophobically-modified alkali-swellable polymers (HASE). HASE may also be referred to as hydrophobically modified alkali-soluble emulsion polymers and are referred to herein synonymously. HASE polymers are synthesized from an acid/acrylate copolymer backbone and include an ethoxylated hydrophone made through emulsion polymerization. See Acusol Rheology Modifiers for Home and Fabric Care Products: The Ingredients of Creativity (May 2008), Rohm and Haas, which is hereby incorporated by reference in its entirety. Beneficially, the HASE polymer rheology modifiers thicken through multiple mechanisms of action, including charge-induced polyelectrolytic chain expansion and association of the extended hydrophone groups. Generally, viscosity is developed by the inorganic bases or organic amines being anionically charged and water soluble; they dissolve and swell due to charge-charge repulsion and thicken instantly. When the polymers swell the pendant hydrophobic groups build associations in the formulation, such as with other polymers, surfactants, particulates, emulsion droplets and dyes. The HASE polymers thicken through this type of associative structures.

Suitable rheology modifiers include those consisting or comprising an acrylic polymer, copolymer, homopolymer, and combinations thereof. Suitable thickeners include synthetic materials, for example, polyacrylates, polyacrylamides, polyalkylene glycols and derivatives including polyethylene glycols or polypropylene glycols, polyvinyl derivatives such as polyvinyl alcohols or polyvinyl acetates, or co-polymers thereof, and other polyvinyl derivatives, and a combination thereof. Polycarboxylic acids are also useful as thickening agents in compositions of the disclosure. ACUSOL® 445 is a partially neutralized, liquid detergent polymer. Other polyacrylic acids of molecular weight 4500 (CRITERION 2005) and 8000 (CRITERION 2108) can be purchased from Kemira Chemicals, Kennesaw, Ga. Other thickening agents include, but are not limited to, Sokalan CP5 available from BASF, Coatex DE185, Dispersant HN44, Acusol® types from Dow Chemicals such as Acusol® 805S or Acusol® 830.

Suitable HASE polymers can have a molecular weight in the range of about 50,000 to about 500,000 g/mol wherein the ratio of x:y is in the range from about 1:20 to about 20:1, the ratio of x:w is in the range from about 1:20 to about 20:1, and the ratio of x:z is in the range from about 1:1 to about 500:1. Examples of commercially-available HASE polymer rheology modifiers according to the above formula are sold under the tradename Acusol 801S, Acusol 805S, Acusol 820, and Acusol 823. Preferred HASE polymer rheology modifiers are sold under the tradename Acusol 805S and 820. In other embodiments, the HASE polymer rheology modifiers have a dynamic (absolute) viscosity range of between about 30 cPS and 500 cPS, preferably between about 40 cPS and 400 cPS, or more preferably between about 100 cPS and 300 cPS.

A particularly preferred rheology modifier is an acrylic copolymer such as Rheosolve T633, commercially available from Coatex. In an embodiment, the rheology modifier comprises a copolymer of Formula (I):

$$A_a\text{-}B_b\text{-}C_c\text{-}D_d \quad (I)$$

wherein A represents units of ethylenically unsaturated monomer(s) having a carboxylic acid group, wherein a represents the percent by weight (wt. %) of the monomer A on the basis of the total weight of the monomer units; and wherein B represents units of ethylenically unsaturated monomer(s) not having a carboxylic acid group, wherein b represents the percent by weight (wt. %) of the monomer B on the basis of the total weight of the monomer(s); and wherein C represents an ethylenically unsaturated oxyalkylated monomer terminated by a hydrophobic fatty chain having at least 26 carbon atoms, wherein c represents the percent by weight (wt. %) of the monomer on the basis of the total weight of the monomer(s). Component D is optional and if included in the copolymer preferably comprises unit(s) of at least one monomer having at least two sites of ethylenic unsaturation such as ethylene glycol dimethacrylate, 2,2-dihydroxymethylbutanol triacrylate, allyl acrylate, methylenebis(meth)acrylamide, tetra allyloxy ethanol, triallyl cyanurates, and allyl ethers derived from polyols such as pentaerythritol, sorbitol, sucrose, or others, wherein d represents the percent by weight (wt. %) of the monomer D on the basis of the total weight of the monomer(s).

In an embodiment of Formula (I), component A comprises units of at least one ethylenically unsaturated monomer and having one or more carboxylic acid groups, which monomer is selected from among the monoacids such as acrylic, methacrylic, crotonic, isocrotonic, and cinnamic acid; the diacids such as itaconic, fumaric, maleic, and citraconic acids; the anhydrides of carboxylic acids such as maleic anhydride, and the hemiesters of diacids, such as the $C_1$-$C_4$ monoesters of maleic and itaconic acid, with the preferred ethylenically unsaturated carboxyl-group-containing (carboxylated) monomer being acrylic acid, methacrylic acid, or itaconic acid.

In an embodiment of Formula (I), component B comprises, optionally, unit(s) of at least one ethylenically unsaturated monomer not having a carboxylic acid group, selected in a non-limiting manner from the group consisting of esters of (meth)acrylic acid such as methyl, ethyl, butyl, or 2-ethylhexyl (meth)acrylate, or from the group consisting of acrylonitrile, vinyl acetate, styrene, methylstyrene, diisobutylene, vinylpyrrolidone, and N-vinylcaprolactam (NVCL); preferably with the ethylenically unsaturated non-carboxylated monomer being selected from the group consisting of acrylic esters such as the $C_1$-$C_4$-alkyl (meth) acrylates.

Further in an embodiment of Formula (I), component C comprises units of at least one monomer according to the formula (C) below, which is an oxyalkylated monomer having ethylenic unsaturation and which is terminated by a hydrophobic fatty chain.

(C)

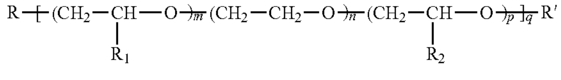

wherein m and p represent the number of oxyalkylene groups, each ≤100; n represents the number of oxyethylene groups≤100, q represents an integer of at least 1, such that q(n+m+p)≤100; wherein R represents an unsaturated polymerizable group, wherein the unsaturated polymerizable group is a vinyl group containing moieties, methacryloyl, maleoyl, itaconyl, crotonyl, an unsaturated urethane moiety, hemiester maleoyl, hemiester itaconyl, $CH_2{=}CHCH_2{-}O{-}$, methacrylamido and substituted methacrylamide; wherein R' represents a hydrophobic group with a fatty chain having at least 26 C atoms, including without limitation an alkyl, alkylaryl, aralkyl, or aryl group, linear or branched, or wherein R' represents a linear or branched hydrophobic alkyl group with at least 28 C atoms, and wherein the number of oxyalkylene groups is between about 10-70; wherein $R_1$ represents hydrogen or a methyl group; and wherein $R_2$ represents hydrogen or a methyl group.

In an embodiment, the vinyl group containing moiety of R is preferably a member selected from the group consisting of acryloyl, a vinyl phthaloyl, a hemiester phthaloyl, acrylamide and a substituted acrylamide, and the unsaturated urethane moiety is preferably (meth)acrylic urethane/acrylurethane, α,α-dimethyl-m-isopropenyl benzyl urethane or urethane.

In an embodiment of Formula (I), component D comprises, optionally, unit(s) of at least one monomer having at least two sites of ethylenic unsaturation such as ethylene glycol dimethacrylate, 2,2-dihydroxymethylbutanol triacrylate, allyl acrylate, methylenebis(meth)acrylamide, tetraallyl oxyethane, the triallyl cyanurates, and the various allyl ethers obtained from polyols such as pentaerythritol, sorbitol, sucrose, or others.

The copolymer according to Formula (I) preferably comprises between about 5 wt. % to about 98 wt. % and preferably between about 20 wt. % to about 50 wt. % units of ethylenically unsaturated monomers having at least one carboxylic acid group; between about 0 wt. % to about 83 wt. % and preferably between about 47 and about 77 wt. % unit(s) of other monomer(s) having ethylenic unsaturation and not having any carboxylic acid groups; between about 2 wt. % to about 18 wt. % and preferably between about 3 wt. % to about 10 wt. % units of the monomer according to Formula (C); and between about 0 wt. to about 5 wt. %, preferably between about 0 wt. % to about 3 wt. % unit(s) of monomer(s) having at-least two sites of ethylenic unsaturation; wherewith the total of components (a.)+(b.)+(c.)+(d.)=100 wt. %.

Further discussion of acrylic copolymers suitable for use as rheology modifiers can be found in U.S. Pat. No. 5,362,415, which is herein incorporated by reference in its entirety.

In a further embodiment, the rheology modifier is a polymer comprising the reaction product of (A) between about 1 wt. % to about 99.8 wt. % of one or more nonionic, cationic, anionic, or amphoteric monomers; (B) between about 0 wt. % to about 98.8 wt. % of one or more monoethylenically unsaturated monomers different from (A); (C) between about 0.1 wt. % to about 98.8 wt. % of one or more monoethylenically unsaturated macromonomers different from (A) and (B); (D) between about 0.1 wt. % to about 98.8 wt. % of one or more monoethylenically unsaturated macromonomers different from (A)-(C); (E) between about 0.0 wt. % to about 20 wt. % or greater of one or more polyethylenically unsaturated monomers different from (A)-(D); and (F) between about 0 wt. % to about 25 wt. % or greater of one or more acrylates or methacrylates derived from a strong acid or a salt of a strong acid different from components (A)-(E).

In a preferred embodiment, component (A) comprises one or more alpha, beta-monoethylenically unsaturated carboxylic acids. Various carboxylic acid monomers can be used, such as acrylic acid, methacrylic acid, ethacrylic acid, a-chloroacrylic acid, crotonic acid, fumaric acid, citraconic acid, mesaconic acid, itaconic acid, maleic acid and the like including a combination thereof. Methacrylic acid is preferred. A large proportion of carboxylic acid monomer is useful in providing a polymeric structure which will solubilize and provide a thickener when reacted with an alkali like sodium hydroxide.

Component (B) comprises one or more monoethylenically unsaturated monomers. The preferred monomers provide water insoluble polymers when homopolymerized and are illustrated by acrylate and methacrylate esters, such as ethyl acrylate, butyl acrylate or the corresponding methacrylate. Other monomers which can be used are styrene, alkyl styrene, vinyl toluene, vinyl acetate, vinyl alcohol, acrylonitrile, vinylidene chloride, vinyl ketones and the like. Nonreactive monomers are preferred, those being monomers in which the single ethylenic group is the only group reactive under the conditions of polymerization. However, monomers which include groups reactive under baking conditions or with divalent metal ions such as zinc oxide may be used in some situations, like hydroxyethyl acrylate.

Component (C) comprises a macromonomer according to Formula ($C_1$):

($C_1$)

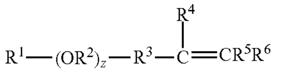

wherein $R^1$ is a monovalent residue of a substituted or unsubstituted complex hydrophobe compound; each $R^2$ is the same or different and is a substituted or unsubstituted divalent hydrocarbon residue; $R^3$ is a substituted or unsubstituted divalent hydrocarbon residue; $R^4$, $R^5$ and $R^6$ are the same or different and are hydrogen or a substituted or unsubstituted monovalent hydrocarbon residue; and z is a value of 0 or greater.

Component (D) comprises a macromonomer according to Formula (D):

(D)

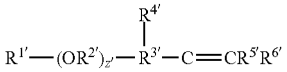

wherein: $R^{1'}$ is a monovalent residue of a substituted or unsubstituted hydrophobic compound other than a complex hydrophobic compound; each $R^{2'}$ is the same or different and is a substituted or unsubstituted divalent hydrocarbon residue; is a substituted or unsubstituted divalent hydrocarbon residue; $R^{4'}$, $R^{5'}$ and $R^{6'}$ are the same or different and are hydrogen or a substituted or unsubstituted monovalent hydrocarbon residue; and z' is a value of 0 or greater.

Further discussion of suitable thickening polymers is found in U.S. Pat. Nos. 5,639,841 and 5,294,693, which are herein incorporated by reference in their entirety. Further suitable rheology modifiers and methods of making thereof are found in U.S. Application No. 2005/0159568 and U.S. Pat. Nos. 5,891,972 and 5,066,710, which are herein incorporated by reference in their entirety.

In an embodiment, the thickener comprises an aqueous suspension comprising a homopolymer of acrylic acid, a water-soluble copolymer of acrylic acid with one or more acrylic, vinyl or allylic monomers, or both the homopolymer and the copolymer, wherein the homopolymer or copolymer has a molecular weight corresponding to a viscosity index with a value from 0.08 to 0.80, and wherein said mineral particles are derived from mechanical reconcentration, thermal reconcentration, or both mechanical and thermal reconcentration after wet grinding in the absence of a dispersant at low concentrations of dry matter. In this embodiment, the homopolymer of acrylic acid is provided in a form partially neutralized or totally neutralized by one or more neutralizing agents having a monovalent function containing an alkaline cation, and optionally by one or more neutralizing agents having a polyvalent function containing an alkaline-earth divalent cation, or a compound containing a higher-valency cation. In this embodiment, the water-soluble copolymer of acrylic acid comprises one or more acrylic, vinyl or allylic monomers which are partially neutralized or totally neutralized by one or more neutralizing agents having a monovalent function containing an alkaline cation, or optionally by one or more neutralizing agents having a polyvalent function containing an alkaline-earth divalent cation, or a compound containing a higher-valency cation. Further discussion of suitable water-soluble thickening agents can be found in U.S. Pat. No. 6,767,973, which is herein incorporated by reference in its entirety.

In a further embodiment, the thickener may include (1) a copolymer of at least one monomer of the formula (II):

$$H_2C{=}C(R^1){-}COOH \quad (II)$$

wherein $R^1$ is a linear or branched $C_1$-$C_6$ alkyl or phenyl group; and (2) at least one monomer of (meth)acrylic acid ($C_1$-$C_6$) alkyl or phenyl ester. Additionally, or in alternative to this copolymer, the thickener may include a copolymer of (1) acrylic or methacrylic acid; (2) at least one monomer of the formula (III):

$$H_2C{=}C(R^3){-}C(O){-}O{-}(CH_2CH_2O)_n{-}R^4 \quad (III)$$

wherein $R^3$ is H or $CH_3$, n is at least 2 and has an average value of at least 10, and $R^4$ is a hydrophobic group containing 8 to 24 carbon atoms; and (3) at least one monomer of $C_1$-$C_4$ alkyl (meth)acrylate. Further discussion of suitable polymer systems can be found in U.S. Pat. No. 9,752,109, which is herein incorporated by reference in its entirety.

In a preferred embodiment, the thickener comprises an acrylic copolymer, such as Rheosolve® T 633, commercially available from Coatex.

In addition to the aforementioned acrylic polymers, further suitable thickeners may be included as needed, for example natural gums such as xanthan gum, guar gum, or other gums from plant mucilage; polysaccharide-based thickeners, such as alginates, starches, and cellulosic polymers (e.g., carboxymethyl cellulose); polyacrylates thickeners; and hydrocolloid thickeners, such as pectin.

In some embodiments, the thickener included is non oxidizable and storage stable under the pH conditions of the disclosure. In an embodiment, the thickener does not leave contaminating residue on the surface of an object. For example, the thickeners or gelling agents can be compatible with food or other sensitive products in contact areas. Generally, the concentration of thickener employed in the present compositions or methods will be dictated by the desired viscosity within the final composition.

Optical Brighteners and Whitening Agents

The detergent compositions may include an optical brightener, also referred to as a fluorescent whitening agent or a fluorescent brightening agent. Brighteners are added to laundry detergents to replace whitening agents removed during washing and to make the clothes appear cleaner. Optical brighteners may include dyes that absorb light in the ultraviolet and violet region (usually 340-370 nm) of the electromagnetic spectrum and re-emit light in the blue region (typically 420-470 nm). These additives are often used to enhance the appearance of the color of a fabric, causing a perceived “whitening” effect, making materials look less yellow by increasing the overall amount of blue light reflected.

Fluorescent compounds belonging to the optical brightener family are typically aromatic or aromatic heterocyclic materials often containing a condensed ring system. A feature of these compounds is the presence of an uninterrupted chain of conjugated double bonds associated with an aromatic ring. The number of such conjugated double bonds is dependent on substituents as well as the planarity of the fluorescent part of the molecule. Most brightener compounds are derivatives of stilbene or 4,4'-diamino stilbene, biphenyl, five membered heterocycles (triazoles, oxazoles, imidazoles, etc.) or six membered heterocycles (naphthalimide, triazine, etc.). The choice of optical brighteners for use in compositions will depend upon a number of factors, such as the type of composition, the nature of other components present in the composition, the temperature of the wash water, the degree of agitation, and the ratio of the material washed to the tub size. The brightener selection is also dependent upon the type of material to be cleaned, e.g., cottons, synthetics, etc. Because most laundry detergent products are used to clean a variety of fabrics, the detergent compositions may contain a mixture of brighteners which are effective for a variety of fabrics. Further, it can be common to employ different temperatures based on the types of fabrics to be washed, with this in mind, it is preferable to an optical brightener effective in low temperature and high temperature wash cycles. It is of course necessary that the individual components of such a brightener mixture be compatible. In a preferred embodiment, the detergent composition contains at least two optical brighteners.

Examples of suitable optical brighteners are commercially available and will be appreciated by those skilled in the art. At least some commercial optical brighteners can be classified into subgroups, including, but are not limited to derivatives of stilbene, pyrazoline, carboxylic acid, methinecyanines, dibenzothiophene-5,5-dioxide, azoles, 5- and 6-membered-ring heterocycles, and other miscellaneous agents. Examples of particularly suitable optical brightening agents include but are not limited to: distyryl biphenyl disulfonic acid sodium salt, cyanuric chloride/diaminostilbene disulfonic acid sodium salt. Examples of suitable commercially available optical brightening agents include, but are not limited to: Tinopal® 5 BM-GX, Tinopal® CBS-CL, Tinopal® CBS-X, Tinopal® DMS-X, Tinopal® DMA-X, and Tinopal® AMS-GX, available from BASF, and Optiblanc MTB available from 3V Sigma USA. Examples of optical brighteners are also disclosed in “The Production and Application of Fluorescent Brightening Agents,” M. Zahradnik, Published by John Wiley & Sons, New York (1982), the disclosure of which is incorporated herein by reference. Suitable stilbene derivatives include but are not limited to derivatives of bis(triazinyl)amino-stilbene, bisacylamino derivatives of stilbene, triazole derivatives of stilbene, triazine derivatives of stilbene, oxadiazole derivatives of stilbene, oxazole derivatives of stilbene, and styryl derivatives of stilbene.

When present, optical brighteners are present individually or in sum, at an amount of from about 0.01 to about 5 wt. %, from about 0.1 wt. % to about 4 wt. %, from about 0.15 wt. % to about 3 wt. %, or from about 0.2 to about 2 wt. % of the total composition, inclusive of all integers within these ranges.

Additional Functional Ingredients

The compositions may include additional functional ingredients. Additional functional ingredients suitable for inclusion in the compositions include, but are not limited to, soil antiredeposition agents, antifoam agents, low foaming surfactants, defoaming surfactants, pigments and dyes, softening agents, anti-static agents, anti-wrinkling agents, dye transfer inhibition/color protection agents, odor removal/odor capturing agents, soil shielding/soil releasing agents, ultraviolet light protection agents, fragrances, sanitizing agents, disinfecting agents, water repellency agents, insect repellency agents, anti-pilling agents, souring agents, mildew removing agents, allergicide agents, and a combination thereof.

In some embodiments, the additional functional ingredient or ingredients is formulated in the compositions. In other embodiments, the additional functional ingredient or ingredients is added separately during a cleaning process.

Enzymes

The composition may include one or more enzymes that promote or enhance soil removal of a variety of soils, including tannin-based, protein-based, carbohydrate-based, or triglyceride-based soils. In an embodiment, the one or more enzymes act by degrading or altering one or more types of soil residues on a surface, thus removing the soil, or making the soil more removable by a surfactant or other component of the composition. Suitable enzymes include, without limitation, a protease, an amylase, a lipase, a gluconase, a cellulase, a peroxidase, or a combination thereof of any suitable origin, such as vegetable, animal, bacterial, fungal or yeast origin. The compositions may comprise between about 1 wt. % to about 30 wt. %, between about 2 wt. % to about 15 wt. %, or between about 5 wt. % to about 10 wt. %, inclusive of all integers within these ranges. In a preferred embodiment, the composition includes between about 1 wt. % to about 10 wt. % of one or more enzymes.

Color Stabilizing Agent

The compositions optionally include a color stabilizing agent. A color stabilizing agent can be any component that is included to inhibit discoloration or browning of the composition. In some embodiments, a color stabilizing agent may be included in the compositions at an amount of from about 0.01 wt. % to about 5 wt. %, from about 0.05 wt. % to about 3 wt. %, and from about 0.10 wt. % to about 2 wt. %, inclusive of all integers within these ranges.

Antiredeposition Agent

The compositions may include antiredeposition agents. Without wishing to be bound by any particular theory, it is thought that antiredeposition agents aid in preventing loosened soil from redepositing onto cleaned fabrics. Antiredeposition agents may be made from complex cellulosic materials such as carboxymethylcellulose (CMC), or synthetic materials such as polyethylene glycol and polyacrylates. In other embodiments, polyphosphate builders may be included as an antiredeposition agent. When present, an antiredeposition agent may be included in the compositions at an amount of from about 0.01 wt. % to about 20 wt. %, from about 0.1 wt. % to about 15 wt. %, and from about 1 wt. % to about 10 wt. %, inclusive of all integers within these ranges.

Bleach Compound or Bleach Composition

As the liquid detergent concentrate composition is preferably used as a detergent for institutional and industrial washing the liquid detergent concentrate composition need not contain any bleaching agents. In institutional and industrial washing processes the bleaching agent is often dosed separately from the detergent. A bleaching composition according may therefore be incorporated into the detergent compositions described herein, or the compositions may include a first part comprising a detergent composition, and a second part comprising a bleach composition.

In some embodiments, the bleaching compositions include about 0.001 wt. % oxidizing agent to about 60 wt. % oxidizing agent, inclusive of all integers within these ranges. In other embodiments, the compositions of the disclosure include about 10 wt. % to about 30 wt. % of one or more oxidizing agents.

Examples of inorganic oxidizing agents include the following types of compounds or sources of these compounds, or alkali metal salts including these types of compounds, or forming an adduct therewith: hydrogen peroxide, urea-hydrogen peroxide complexes or hydrogen peroxide donors of: group 1 (IA) oxidizing agents, for example lithium peroxide, sodium peroxide; group 2 (IIA) oxidizing agents, for example magnesium peroxide, calcium peroxide, strontium peroxide, barium peroxide; group 12 (IIB) oxidizing agents, for example zinc peroxide; group 13 (IIIA) oxidizing agents, for example boron compounds, such as perborates, for example sodium perborate hexahydrate of the formula $Na_2[B_2(O_2)_2(OH)_4].6H_2O$ (also called sodium perborate tetrahydrate); sodium peroxyborate tetrahydrate of the formula $Na_2B_2(O_2)_2[(OH)_4].4H_2O$ (also called sodium perborate trihydrate); sodium peroxyborate of the formula $Na_2[B_2(O_2)_2(OH)_4]$ (also called sodium perborate monohydrate); group 14 (IVA) oxidizing agents, for example persilicates and peroxycarbonates, which are also called percarbonates, such as persilicates or peroxycarbonates of alkali metals; group 15 (VA) oxidizing agents, for example peroxynitrous acid and its salts; peroxyphosphoric acids and their salts, for example, perphosphates; group 16 (VIA) oxidizing agents, for example peroxysulfuric acids and their salts, such as peroxymonosulfuric and peroxydisulfuric acids, and their salts, such as persulfates, for example, sodium persulfate; and group VIIA oxidizing agents such as sodium periodate, potassium perchlorate. Other active inorganic oxygen compounds can include transition metal peroxides; and other such peroxygen compounds, and a combination thereof. Examples of organic oxidizing agents include, but are not limited to, perbenzoic acid, derivatives of perbenzoic acid, t-butyl benzoyl hydroperoxide, benzoyl hydroperoxide, or any other organic based peroxide and a combination thereof, as well as sources of these compounds.

The compositions of the present disclosure may employ one or more of the inorganic oxidizing agents listed above. Suitable inorganic oxidizing agents include ozone, hydrogen peroxide, hydrogen peroxide adduct, group IIIA oxidizing agent, or hydrogen peroxide donors of group VIA oxidizing agent, group VA oxidizing agent, group VIIA oxidizing agent, or a combination thereof. Suitable examples of such inorganic oxidizing agents include percarbonate, perborate, persulfate, perphosphate, persilicate, or a combination thereof.

Alternatively, or in addition to the aforementioned bleaching agents, the bleaching compositions of the detergent compositions described herein may include one or more carboxylic or percarboxylic acids. The carboxylic and peroxycarboxylic acids may be used as part of the bleach compound, and may provide additional uses, such as pH adjustment, antimicrobial efficacy, bleaching/bleach activation, and others.

Suitable carboxylic acids include one or more $C_1$ to $C_{22}$ carboxylic acids. Examples of suitable carboxylic acids include, but are not limited to, formic, acetic, propionic, butanoic, pentanoic, hexanoic, heptanoic, octanoic, nonanoic, decanoic, undecanoic, dodecanoic, as well as their branched isomers, lactic, maleic, ascorbic, citric, hydroxyacetic, neopentanoic, neoheptanoic, neodecanoic, oxalic, malonic, succinic, glutaric, adipic, pimelic subric acid, and a combination thereof.

Suitable peroxycarboxylic acids include one or more $C_1$-$C_{22}$ peroxycarboxylic acids. Peroxycarboxylic acids useful in the compositions include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, or the peroxyacids of their branched chain isomers, peroxylactic, peroxymaleic, peroxyascorbic, peroxyhydroxyacetic, peroxyoxalic, peroxymalonic, peroxysuccinic, peroxyglutaric, peroxyadipic, peroxypimelic and peroxysubric acid and a combination thereof. The bleaching compositions may utilize a combination of several different peroxycarboxylic acids. For example, in some embodiments, the composition includes one or more $C_1$ to $C_4$ peroxycarboxylic acids and one or more $C_5$ to $C_{12}$ peroxycarboxylic acids. In some embodiments, the $C_1$ to $C_4$ peroxycarboxylic acid is peroxyacetic acid and the $C_5$ to $C_{12}$ acid is peroxyoctanoic acid.

When present, the carboxylic acid or peroxycarboxylic acid may each be present in an amount of between about 0.1 wt. % to about 80 wt. % of the composition, inclusive of all integers within this range. In an embodiment, the bleach composition comprises from about 1 wt. % to about 30 wt. % of a peroxycarboxylic acid, from about 0.01 wt. % to about 35 wt. % of hydrogen peroxide, from about 0.01 wt. % to about 35 wt. % of a carboxylic acid, or a combination thereof. Still further preferred, the bleaching composition comprises at least a mixture of hydrogen peroxide, peracid and the corresponding acid. Most preferred, the bleaching composition comprises at least hydrogen peroxide, peroxyacetic acid and acetic acid.

Antimicrobial Agents

The composition may further include one or more antimicrobial agents. The one or more antimicrobial agent may comprise a peroxycarboxylic acid with antimicrobial capacity, as described herein. Additionally, or alternatively, the antimicrobial agent may comprise an antimicrobial cationic surfactant, such as an antimicrobial quaternary ammonium compound. When utilized, the antimicrobial agent may be present in amounts of between about 0 wt. % to about 25 wt. %, from about 0.001 wt. % to about 20 wt. %, from about 0.01 wt. % to about 15 wt. %, from about 0.1 wt. % to about 10 wt. %, or from about 1 wt. % to about 5 wt. % based on the total weight of the composition, inclusive of all integers within this range.

Methods of Use

The detergent compositions are suited for various applications of use. Laundry and textile detergents are a particularly preferred application of use for the compositions. The method for washing textiles comprises providing the liquid detergent concentrate composition, diluting the liquid detergent concentrate composition to a stable aqueous use solution at a ratio of between about 1 to about 100 parts water to 1 part concentrate composition, inclusive of all integers within this range. In an embodiment, the dilution ratio is about 10 parts water to about 1-part concentrate composition. In a further embodiment, dilution occurs such that the compositions are present in the aqueous solution in an amount of between about 10 ppm to about 10,000 ppm, inclusive of all integers within this range. In a preferred embodiment, the aqueous use solution comprises between about 500 to about 1,000 ppm detergent composition. The methods of use further comprise optionally adding a bleaching composition to the liquid detergent concentrate composition or to the use solution, and washing the textiles in an institutional or household washing machine in the use solution.

Additional cleaning applications can be employed where there is a need for a rheology modifier package to provide built detergent formulations containing nonionic surfactants and alkalinity sources or builders. For example, detergent compositions for hard surface cleaning, membrane cleaning, paper processing or water treatment, and various laundry applications can be employed. It is desirable for the detergent compositions to be uniformly dispensed using conventional dispensing, such as pumps, due to the rheology modifier package employed.

The detergent compositions can be applied to surfaces using a variety of methods. These methods can operate on an object, surface, or the like, by contacting the object or surface with the detergent composition. Contacting can comprise any of numerous methods for applying a viscous liquid, such as pumping the composition for further use or dilution of a concentrate, immersing the object in the composition, foam or gel treating the object with the composition, or a combination thereof. Without being limited to the contacting according to the disclosure, a concentrate or use liquid composition can be applied to or brought into contact with an object by any conventional method or apparatus for applying a viscous liquid composition to an object. For example, the surface can be wiped with, sprayed with, foamed on, or immersed in the liquid compositions, or use liquid compositions made from the concentrated liquid compositions. The liquid compositions can be sprayed, foamed, or wiped onto a surface; the compound can be caused to flow over the surface, or the surface can be dipped into the compound. Contacting can be manual or by machine.

The detergent compositions are in contact with a surface or object for a sufficient amount of time to clean the surface or object. In an embodiment, the surface or object is contacted with the detergent composition for at least about 1 minute, or at least about 15 minutes. The detergent compositions can be applied at a use or concentrate solution to a surface or object in need of cleaning.

All publications and patent applications in this specification are indicative of the level of ordinary skill in the art to which this disclosure pertains. All publications and patent applications are herein incorporated by reference to the same extent as if each individual publication or patent application were specifically and individually indicated as incorporated by reference.

EXAMPLES

Embodiments of the present disclosure are further defined in the following non-limiting Examples. It should be understood that these Examples, while indicating certain embodiments of the disclosure, are given by way of illustration only.

From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

The following materials were employed:

Isofol 12: a C12 Guerbet alcohol, specifically 2-butyl-1-octanol

Carbopol ETD 2691: a crosslinked polyacrylic acid polymer

Rheosolve T 633: an acrylic copolymer rheology modifier

Sodium hydroxide: an alkalinity source

Acusol 944: a partially neutralized polyacrylic acid (acrylic acid homopolymer)

Acusol 505N: Acrylic/maleic acid copolymer with a molecular weight of 40,000 g/mol Acusol 448: Acrylic/maleic copolymer with a molecular weight of 3000-3500 g/mol Surfonic L24-7: $C_{12}$-$C_{14}$ alcohol ethoxylate (7EO)

Surfonic L24-3: $C_{12}$-$C_{14}$ alcohol ethoxylate (3EO)

Surfonic L24-5: $C_{12}$-$C_{14}$ alcohol ethoxylate (5EO)

Novel TDA-3: Alcohol adduct of tridecyl alcohol (3EO)

Novel TDA-9: Alcohol ethoxylate adduct of tridecyl alcohol (9EO)

Glucopon 625 UP: Long chain alkylpolyglycoside having a $C_{12}$-$C_{16}$ alkyl group and an average degree of polymerization (DP) of 1.6.

Example 1

Compositions of the present disclosure were prepared according to Table 3. These compositions were compared to a commercially available formulation, a positive control, and a negative control as shown in Table 4.

TABLE 3

| Material | Ex. 1 wt. % | Ex. 2 wt. % | Ex. 3 wt. % | Ex. 4 wt. % | Ex. 5 wt. % | Ex. 6 wt. % | Ex. 7 wt. % | Ex. 8 wt. % | Ex. 9 wt. % | Ex. 10 wt. % | Ex. 11 wt. % | Ex. 12 wt. % | Ex. 13 wt. % | Ex. 14 wt. % |
|---|---|---|---|---|---|---|---|---|---|---|---|---|---|---|
| Soft Water | 24.4 | 25.4 | 24.4 | 25.4 | 24.4 | 25.4 | 24.4 | 25.4 | 19.4 | 20.4 | 21.9 | 22.9 | 24.4 | 24.4 |
| 2-butyl-1-octanol | 1 | | 1 | | 1 | | 1 | | 1 | | 1 | | 1 | 1 |
| crosslinked polyacrylic acid polymer | | | | | | | | | | | | | | |
| Acrylic copolymer rheology modifier | 1.6 | 1.6 | 1.6 | 1.6 | 1.6 | 1.6 | 1.6 | 1.6 | 1.6 | 1.6 | 1.6 | 1.6 | 1.6 | 1.6 |
| Alkalinity Source | 45 | 45 | 45 | 45 | 45 | 45 | 45 | 45 | 45 | 45 | 45 | 45 | 45 | 45 |
| Partially neutralized polyacrylic acid (acrylic acid homopolymer) | 6.3 | 6.3 | 6.3 | 6.3 | 6.3 | 6.3 | 6.3 | 6.3 | 6.3 | 6.3 | 6.3 | 6.3 | 6.3 | 6.3 |
| Acrylic/maleic acid copolymer with a molecular weight of 40,000 g/mol | | | | | | | | | | | | | | |
| Acrylic/maleic copolymer with a molecular weight of 3000-3500 g/mol | 3 | 3 | 3 | 3 | 3 | 3 | 3 | 3 | 3 | 3 | 3 | 3 | 3 | 3 |
| C12-C14 alcohol ethoxylate (7EO) | 2.5 | 2.5 | 5 | 5 | 3 | 3 | 4 | 4 | 10 | 10 | 10 | 10 | 7.5 | |
| C12-C14 alcohol ethoxylate (3EO) | 7.5 | 7.5 | 5 | 5 | 7 | 7 | 6 | 6 | 5 | 5 | 5 | 5 | 2.5 | |
| C12-C14 alcohol ethoxylate (5EO) | | | | | | | | | | | | | | 10 |
| Alcohol ethoxylate adduct of tridecyl alcohol (9EO) | 7.5 | 7.5 | 7.5 | 7.5 | 7.5 | 7.5 | 7.5 | 7.5 | 7.5 | 7.5 | 5 | 5 | 7.5 | 7.5 |
| Long chain APG having a DP of 1.6 | 1.2 | 1.2 | 1.2 | 1.2 | 1.2 | 1.2 | 1.2 | 1.2 | 1.2 | 1.2 | 1.2 | 1.2 | 1.2 | 1.2 |

TABLE 4

| Description | Comparative Formula (wt. %) | Negative Control (wt. %) | Positive Control (wt. %) |
|---|---|---|---|
| Soft Water | 25.55 | 24.4 | 24.4 |
| 2-butyl-1-octanol | 1 | 1 | 1 |
| crosslinked polyacrylic acid polymer | 0.45 | | |
| Acrylic copolymer rheology modifier | | 1.6 | 1.6 |
| Alkalinity Source | 45 | 45 | 45 |
| Partially neutralized polyacrylic acid (acrylic acid homopolymer) | 6.3 | 6.3 | 6.3 |
| Acrylic/maleic acid copolymer with a molecular weight of 40,000 g/mol | 3 | 3 | |
| Acrylic/maleic copolymer with a molecular weight of 3000-3500 g/mol | | | 3 |
| C12-C14 alcohol ethoxylate (7EO) | 10 | 10 | |
| C12-C14 alcohol ethoxylate (3EO) | | | 10 |
| C12-C14 alcohol ethoxylate (5EO) | | | |
| Alcohol ethoxylate adduct of tridecyl alcohol (9EO) | 7.5 | 7.5 | 7.5 |
| Long chain APG having a DP of 1.6 | 1.2 | 1.2 | 1.2 |

Particle and droplet velocity distributions were measured for each of the formulas in Tables 3 and 4 in order to assess stability (and by extension shelf life) over a period of time. In particular, samples were prepared of the formulas in Tables and each sample was dispensed into a LUMisizer cuvette. The cuvettes were then placed in the LUMisizer. The temperature range was set to between 4° C. and 49° C. (120° F.). Stability index was then assessed. Stability index refers to the amount of separation over time (0=no separation, 1=complete separation). The separation number provided by the LUMisizer software is calculated based on the transmission profile of the sample. Front tracking indicates the rate of separation over time. A steeper curve indicates faster separation. Finally, particle sizing can be characterized in a variety of ways, the most relevant of which is velocity distribution, which measures the creaming or sedimentation velocity distribution of particle size classes and plots a creaming velocity distribution according of particle size accordingly.

The results of these analyses are shown in Table 5.

TABLE 5

| Formula | Separation? |
|---|---|
| Comparative Formula | |
| Negative Control | Yes, at 120° F. |
| Positive Control | No |
| Ex. 1 | No |
| Ex. 2 | |
| Ex. 3 | No |
| Ex. 4 | |
| Ex. 5 | No |
| Ex. 6 | |
| Ex. 7 | No |
| Ex. 8 | |
| Ex. 9 | Yes, at 120° F. |
| Ex. 10 | |
| Ex. 11 | No |
| Ex. 12 | |
| Ex. 13 | Yes, at 120° F. |
| Ex. 14 | No |

As shown in Table 5, compositions which do not use both an acrylic copolymer rheology modifier and one or more low mole linear alcohol ethoxylates demonstrate unacceptable or poor stability. In comparison, the example formulations utilizing the combination of an acrylic copolymer rheology modifier and one or more low mole linear alcohol ethoxylates at a minimum of about 5 wt. %. Formulas without 2-butyl-1-octanol were expected to perform the same as their 2-butyl-1-octanol-containing counterparts.

Example 2

Further evaluation was conducted comparing the impact of HLB and moles of ethylene oxide on formula stability. Use of an acrylic copolymer rheology modifier is desirable due to its ability to maintain a preferred viscosity even under high pH conditions. However, substitution of an acrylic copolymer rheology modifier in place of other rheology modifiers was not successful. It was therefore necessary to develop new surfactant packages which not only contributed to the preferred viscosity but also maintained stability of the composition.

Accordingly, compositions were prepared with a base composition comprising about 1-3 wt. % of an acrylic copolymer rheology modifier and about 10-50 wt. % of an alkalinity source. Added to the base composition was one or more low mole alcohol ethoxylates and ethoxylated tridecyl alcohols (e.g., 3EO-5EO alcohol ethoxylates such as TDA-3, L24-3), and in some instances an acrylic/maleic copolymer with a molecular weight of 3000-3500 g/mol (e.g., Acusol 448), as shown in Table 6 below.

TABLE 6

| Formula | LUMisizer Stability Index | Average Viscosity (5 weeks) |
|---|---|---|
| TDA-3 | 0.427 | 4235 |
| L24-3 | 0.243 | 4099 |
| TDA-3 & L24-3 | 0.651 | 4373 |
| Acusol 448 | 0.618 | 5365 |
| TDA-3 & Acusol 448 | 0.517 | 3950 |
| L24-3 & Acusol 448 | 0.186 | 4152 |
| TDA-3 & L24-3 & Acusol 448 | 0.501 | 4264 |

As shown in FIG. 1, the compositions combining both the acrylic/maleic copolymer and one or more low mole ethoxylated surfactants demonstrate excellent average viscosity and provide a low separation index. In particular, FIG. 1 shows that the combination of a 3EO alcohol ethoxylate with the low molecular weight acrylic/maleic copolymer resulted in a stability index that is lower than all other combinations tested. Overall, however, FIG. 1 shows that the acrylic copolymer rheology modifier together with the combination of one or more low mole alcohol ethoxylates and a low molecular weight acrylic/maleic copolymer provide an ideal viscosity range of between about 500 cps to about 2,000 cps at room temperature and a stable composition having a separation index of about <0.3.

Without being bound by theory it is thought that low mole linear alcohol ethoxylates having an HLB of between about 7 to about 9 interact with the hydrophobically modified acrylic copolymer to improve stability. In particular, it is thought that higher mole linear alcohol ethoxylates are larger and thus less able to tightly bind with the hydrophobically modified acrylic copolymer.

Example 3

Further evaluation of the relative concentrations of rheology modifier, APG, and surfactant was conducted. Base formulas were prepared containing the materials in Table 7.

TABLE 7

| Material | (wt. %) |
|---|---|
| Alkalinity Source | 45 |
| 7EO ethoxylate of a linear, primary $C_{12}$-$C_{14}$ alcohol | 10 |
| 3EO ethoxylate of a linear, primary $C_{12}$-$C_{14}$ alcohol | 5 |
| Optical brightening agent (optional) | 0.05 |

Varying concentrations of rheology modifier, APG, and an additional nonionic surfactant were then added to the compositions. The compositions were then observed over the course of 8 weeks to evaluate their 8 week viscosity and percent separation. Percent separation was recorded at three different temperatures, room temperature, 40° C., and 50° C. Ideal viscosity was between 500 cPs and 1500 cPs, although less than 2500 cPs was deemed acceptable. Percent separation refers to the degree to which the emulsion separates over time. Less than or equal to 4% separation was considered adequate, and exceptional percent separation is less than or equal to 1%. The results of this analysis are shown in Table 8.

TABLE 8

| Ex. | Acrylic Copolymer Rheology Modified[1] (wt. %) | Polymer[2] (wt. %) | APG[3] (wt. %) | Nonionic Surfactant[4] (wt. %) | 8 week Viscosity (Cp) | % Separation-8 weeks RT | 40C | 50C |
|---|---|---|---|---|---|---|---|---|
| 1 | 2.40 | 8.2 | 0 | 5 | 704 | 1.22% | 2.67% | 3.53% |
| 2 | 1.40 | 7.5 | 0 | 2.5 | 284 | 10.53% | 24.66% | 39.19% |
| 3 | 1.60 | 9.3 | 1.2 | 5 | 914 | 1.28% | 1.28% | 2.70% |
| 4 | 1.90 | 7.5 | 1 | 7.5 | 1268 | <1% | <1% | 2.44% |
| 5 | 2.40 | 7.5 | 1.2 | 2.5 | 1964 | 0.00% | <1% | <1% |
| 6 | 2.00 | 9.7 | 1.2 | 5 | 1272 | <1% | <1% | <1% |
| 7 | 1.50 | 10.6 | 0.5 | 2.5 | 318 | 2.67% | 3.80% | 7.41% |
| 8 | 1.52 | 11 | 0 | 5 | 840 | 17.72% | 27.16% | 28.95% |
| 9 | 2.00 | 9.7 | 1.2 | 5 | 1508 | 0.00% | <1% | 1.25% |
| 10 | 2.30 | 10.9 | 0.2 | 7.5 | 3624 | 3.75% | 1.25% | 4.88% |
| 11 | 2.40 | 11 | 0.9 | 2.5 | 1260 | 0.00% | <1% | 1.28% |
| 12 | 1.90 | 9.4 | 0.4 | 2.5 | 448 | 1.25% | 1.35% | 2.47% |
| 13 | 1.60 | 8.2 | 0 | 7.5 | 1558 | 17.50% | 25.33% | 27.50% |
| 14 | 1.90 | 7.5 | 1 | 7.5 | 1724 | <1% | <1% | <1% |
| 15 | 1.40 | 9 | 0.7 | 5 | 560 | 1.28% | 1.27% | 2.47% |
| 16 | 1.50 | 8 | 1.2 | 2.5 | 592 | 1.23% | 1.33% | 1.41% |
| 17 | 1.90 | 7.5 | 0.6 | 5 | 800 | <1% | 1.23% | 1.32% |
| 18 | 1.40 | 10.6 | 0.5 | 2.5 | 320 | 2.67% | 2.50% | 4.00% |
| 19 | 2.10 | 8.7 | 0.4 | 7.5 | 1480 | <1% | 1.33% | 1.30% |
| 20 | 1.50 | 11 | 0.9 | 7.5 | 1264 | 1.23% | 1.27% | 1.30% |

[1]Acrylic copolymer rheology modifier according to the formula $A_a$—$B_b$—$C_c$—$D_d$ as described herein.
[2]Acrylic acid homopolymer or acrylic/maleic copolymer
[3]Alkylpolyglucoside
[4]9 EO alcohol ethoxylate Examples 2, 7-8, 10, and 13 demonstrated substantial phase separation. Examples 1, 3-5, 12, 15-16, and 18 demonstrated an acceptable percent separation, i.e., less than or equal to about 4% separation. Examples 6, 9, 11, 14, 17 and 19-20 demonstrated very minimal phase separation (less than 2%). Overall, the formulations having between about 1.5-2.5% rheology modifier and between 0.4-1.5% APG provided acceptable degrees of phase separation. Using between 5-7.5% of a 9EO alcohol ethoxylate surfactant with 1.5-2.5% rheology modifier and 0.4-1.5% The APG further reduced percent separation to less than 1%.

Example 4

The formulations of the disclosure were evaluated for their textile soil removing efficacy. Although Examples 1-3 demonstrate that the instant formulations provide improved stability and ideal viscosity, these formulations must still provide comparable or improved soil removal capabilities compared to control compositions. Accordingly, an example formulation was prepared according to Table 9.

TABLE 9

| Material | Wt. % |
|---|---|
| Water | 22.45 |
| Acrylic copolymer rheology modifier | 2.00 |
| Alkalinity source (50%) | 45.00 |
| Acrylic acid homopolymer (50%) | 6.30 |
| Acrylic/maleic copolymer (mol. wt. 3000-3500 g/mol) | 3.00 |
| Alkylpolyglucoside with a DP of 1.6 | 1.20 |
| 7EO ethoxylate of a linear, primary $C_{12}$-$C_{12}$ alcohol | 10.00 |
| 3EO ethoxylate of a linear, primary $C_{12}$-$C_{12}$ alcohol | 5.00 |

TABLE 9-continued

| Material | Wt. % |
|---|---|
| Optical brightening agent | 0.05 |
| 9EO alcohol ethoxylate | 5.00 |

This formulation was compared to a baseline, commercially available laundry emulsion as shown in Table 10.

TABLE 10

| Material | Wt. % |
|---|---|
| Alkalinity source (50%) | 40-50 |
| 9EO alcohol ethoxylate | 7-10 |
| 7EO Fatty Alcohol $C_{13}$-$C_{15}$ Ethoxylate | 10-20 |
| Acrylic acid homopolymer (50%) | 5-10 |
| Acrylic/maleic copolymer (mol. wt. 40,000 g/mol) | 1-5 |
| Alkylpolyglucoside | 1-3 |
| Optical brightening agent | 0.1-1 |
| Water | Remainder |

Textiles treated with a wide variety of soils were treated with the formulations in Table 9 and Table 10. Percent soil removal was calculated for each soil and for total soil removal. The results of this analysis are shown in Table 11 and FIG. 2.

monomer having at least two sites of ethylenic unsaturation, and d is the weight percent of D on the basis of the total weight of the monomer units;

one or more sequestering agents, wherein the one or more sequestering agents comprises an acrylic/maleic copolymer with a molecular weight of 3,000-3,500 g/mol;

one or more nonionic surfactants, wherein the one or more nonionic surfactants comprises a $C_{12}$-$C_{14}$ linear alcohol ethoxylate with 3 to 5 moles of ethoxylation; and an alkylpolysaccharide.

2. The composition of claim 1, wherein the alkalinity source comprises an alkali metal hydroxide, alkali metal carbonate, alkali metal silicate, or a combination thereof.

3. The composition of claim 1, wherein the one or more nonionic surfactants further comprises an alcohol alkoxylate, a propoxylated alcohol, an ethylene oxide adduct of tridecyl alcohol, or a combination thereof.

TABLE 11

| | Blood (C) | Chloro-phyll (P) | Clay (P/C) | Cocoa (C) | Coffee (C) | Lanolin (P/C) | Lip-stick (P) | Make-up (C) | Make-up (P/C) | Motor Oil (P/C) | Olive Oil (P/C) | Porridge (C) | Sebum (P/C) | Tea (C) | Tomato-Beef Sauce (P/C) | Grand Total |
|---|---|---|---|---|---|---|---|---|---|---|---|---|---|---|---|---|
| Site 1 | 84.77 | 42.92 | 30.08 | 25.62 | 40.01 | 31.13 | 46.18 | 38.75 | 41.36 | 15.62 | 38.58 | 43.39 | 56.00 | 48.03 | 43.03 | 41.70 |
| Control | 84.91 | 43.77 | 31.45 | 27.29 | 41.50 | 32.65 | 46.77 | 39.59 | 40.20 | 15.88 | 40.35 | 43.42 | 54.81 | 49.76 | 49.94 | 42.82 |
| Ex. 1 | 84.62 | 42.07 | 28.71 | 23.95 | 38.52 | 29.61 | 45.59 | 37.92 | 42.51 | 15.35 | 36.81 | 43.35 | 57.19 | 46.30 | 36.12 | 40.58 |
| Site 2 | 84.58 | 46.10 | 35.61 | 39.74 | 43.74 | 44.80 | 49.67 | 50.54 | 43.76 | 21.76 | 52.72 | 43.87 | 60.62 | 53.20 | 50.95 | 48.11 |
| Control | 83.89 | 44.64 | 36.94 | 38.74 | 44.08 | 41.87 | 48.88 | 50.76 | 43.47 | 20.99 | 49.71 | 41.81 | 58.83 | 53.04 | 48.77 | 47.09 |
| Ex. 1 | 85.21 | 47.44 | 34.39 | 40.66 | 43.43 | 47.49 | 50.40 | 50.34 | 44.03 | 22.46 | 55.48 | 45.75 | 62.27 | 53.35 | 52.96 | 49.04 |
| Grand Total | 84.68 | 44.48 | 32.79 | 32.53 | 41.84 | 37.82 | 47.89 | 44.52 | 42.53 | 18.62 | 45.50 | 43.62 | 58.26 | 50.56 | 46.91 | 44.84 |

Figure 2:
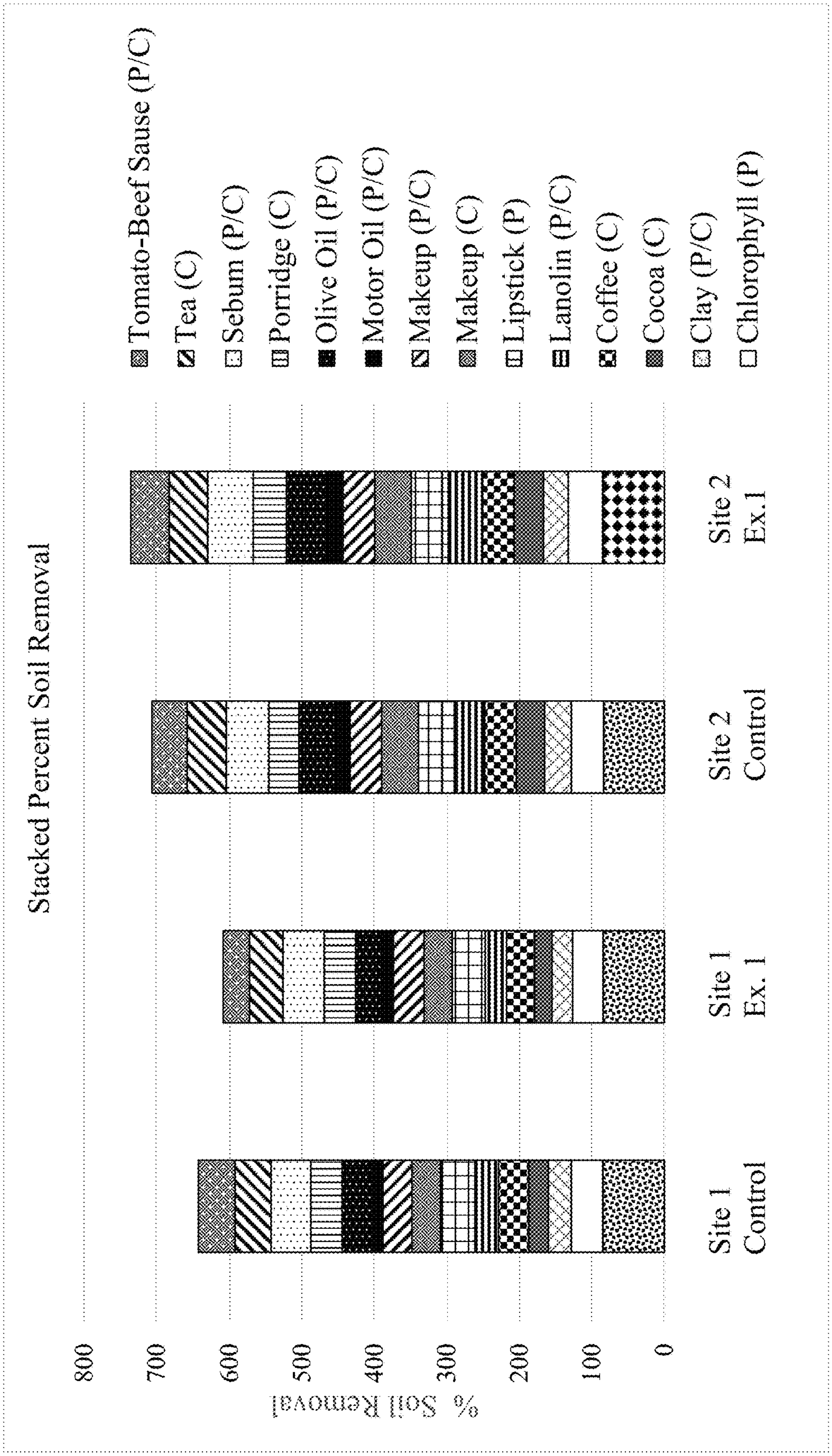
FIG. 2 is a graphical representation of the stacked or overall percentage of soil removal provided by the compositions on a variety of soil types.

As shown in Table 11 and FIG. 2, the formulation of Table 9 performs at least as good as, and in some cases better than, the control composition. These data demonstrate that the instant compositions beneficially provide substantially improved stability and ideal viscosity while still maintaining excellent soil removal efficacy.

The applications being thus described, it will be obvious that the same may be varied in many ways. Such variations are not to be regarded as a departure from the spirit and scope of the applications and all such modifications are intended to be included within the scope of the following claims. The above specification provides a description of the manufacture and use of the disclosed compositions and methods. Since many embodiments can be made without departing from the spirit and scope of the disclosure, the disclosure resides in the claims.

What is claimed is:

1. A liquid detergent composition comprising:

an alkalinity source;

an acrylic copolymer rheology modifier according to the formula:

$$A_a\text{-}B_b\text{-}C_c\text{-}D_a$$

wherein A is at least one ethylenically unsaturated monomer having one or more carboxylic acid groups, a is the weight percent of A on the basis of the total weight of the monomer units, B is at least one ethylenically unsaturated monomer not having a carboxylic acid group, b is the weight percent of B on the basis of the total weight of the monomer units, C is at least one oxyalkylated monomer having ethylenic unsaturation and which is terminated by a hydrophobic fatty chain, c is the weight percent of C on the basis of the total weight of the monomer units, D is optional and if present comprises at least one

4. The composition of claim 3, wherein the one or more nonionic surfactants comprises a 3 to 9 mole ethylene oxide adduct of tridecyl alcohol.

5. The composition of claim 1, wherein the alkylpolysaccharide is a compound according to the formula:

$$RO(R^1O)_tZ_x$$

wherein Z is a moiety derived from a reducing saccharide containing from 5 to 6 carbon atoms, R is a hydrophobic $C_8$-$C_{20}$ group, $R^1$ is a $C_2$-$C_4$ group, tis from 0 to about 30, and x is a number from about 1 to about 10.

6. The composition of claim 1, wherein the alkylpolysaccharide is a compound according to the formula:

$$R_1O(R_2O)_b(Z)_a$$

wherein $R_1$ is a monovalent organic radical having from about 6 to about 30 carbon atoms; $R_2$ is a divalent alkylene radical having from 2 to 4 carbon atoms; b is a number from 0 to about 12; a is a number from 1 to about 6, and Z is a saccharide residue having 5 or 6 carbon atoms.

7. The composition of claim 1, wherein the one or more sequestering agents further comprises an aminocarboxylate, aminophosphonate, phosphonate, polycarboxylate, or a combination thereof.

8. The composition of claim 1, wherein the composition comprises two sequestering agents and three nonionic surfactants.

9. The composition of claim 1, wherein the composition is free of Guerbet alcohols.

10. The composition of claim 1, wherein the composition is free of nonionic surfactants having a degree of ethoxylation of greater than 9.

11. The composition of claim 1, wherein the composition has a viscosity of between about 500 cPs and about 1500 cPs.

12. The composition of claim 1, wherein the composition comprises from about 0.1 wt. % to about 5 wt. % of the rheology modifier.

13. The composition of claim 12, wherein the composition comprises from about 10 wt. % to about 50 wt. % of the alkalinity source.

14. The composition of claim 13, wherein the composition comprises from about 0.5 wt. % to about 15 wt. % of the one or more sequestering agents, from about 0.5 wt. % to about 25 wt. % of the one or more nonionic surfactants.

15. A method of dispensing the liquid detergent composition according to claim 1 for washing textiles comprising:

dispensing into a washing machine the liquid detergent composition wherein the composition has a viscosity of less than about 6000 cPs.

16. The method of claim 15, further comprising diluting the liquid detergent composition before the liquid detergent composition is dispensed into the washing machine.

17. A method of cleaning a textile comprising:

diluting the liquid detergent composition according to claim 1 to form a use solution; and contacting a textile with the use solution in a washing machine.

18. The method of claim 17, wherein the composition has a viscosity of less than 2500 cPs.

19. The method of claim 17, wherein the washing machine is an institutional washing machine.

* * * * *